US012684222B2

(12) United States Patent　　　　　(10) Patent No.:　US 12,684,222 B2
Toyoda　　　　　　　　　　　　　　(45) Date of Patent:　　　Jul. 14, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Takuya Toyoda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/498,154

(22) Filed: Oct. 31, 2023

(65) Prior Publication Data

US 2024/0163544 A1　　May 16, 2024

(30) Foreign Application Priority Data

Nov. 15, 2022　(JP) ................................. 2022-182256

(51) Int. Cl.
　　*H04N 23/611*　　(2023.01)
　　*H04N 23/69*　　(2023.01)
(52) U.S. Cl.
　　CPC ........... *H04N 23/611* (2023.01); *H04N 23/69* (2023.01)
(58) Field of Classification Search
　　CPC ...... H04N 23/611; H04N 23/69; H04N 23/61; H04N 23/631; H04N 23/635; H04N 23/695
　　USPC .... 348/222.1, 169, 240.2, 240.99, 345, 143, 348/208.14
　　See application file for complete search history.

(56) References Cited

U.S. PATENT DOCUMENTS

| 8,885,069 | B2 * | 11/2014 | Kunishige | .............. | H04N 23/69 |
| | | | | | 348/240.99 |
| 9,253,410 | B2 * | 2/2016 | Tsubusaki | ............ | H04N 23/611 |
| 9,665,260 | B2 * | 5/2017 | Lee | ..................... | G06F 3/04845 |

(Continued)

FOREIGN PATENT DOCUMENTS

| CN | 104168449 A | 11/2014 |
| JP | 2009-033450 A | 2/2009 |

(Continued)

OTHER PUBLICATIONS

Extended European Search Report issued Apr. 10, 2024, in corresponding European Patent No. 23207372.6 (22 pages).

(Continued)

*Primary Examiner* — Asmamaw G Tarko
(74) *Attorney, Agent, or Firm* — Venable LLP

(57)　　　　　　　ABSTRACT

An information processing apparatus including at least one memory and at least one processor communicating with the memory. The at least one processor acts as a detection unit to detect a predetermined target from an image that has been image captured by an image capturing device, a control unit to execute a first control to track the predetermined target or a second control not to track the predetermined target, and a setting unit to set a predetermined region and an exit determination region smaller than the predetermined region in relation to the image. The control unit controls the first control (i) when it is detected that the predetermined target is included outside the predetermined region, or (ii) after it has been detected that the predetermined target is included within the predetermined region, when it is detected that the predetermined target is included within the exit determination region.

18 Claims, 19 Drawing Sheets

(56)  References Cited

U.S. PATENT DOCUMENTS

| | | | | |
|---|---|---|---|---|
| 9,679,394 B2* | 6/2017 | Yoshizumi | ................ | G06T 7/73 |
| 10,042,031 B2* | 8/2018 | Kumar | .................. | G06V 20/52 |
| 10,939,055 B2* | 3/2021 | Mikami | .............. | H04N 25/533 |
| 12,149,822 B2* | 11/2024 | Suzuki | ................ | H04N 23/667 |
| 2011/0001840 A1* | 1/2011 | Ishii | ....................... | G02B 7/365 |
| | | | | 348/222.1 |
| 2012/0062769 A1* | 3/2012 | Kinoshita | ........... | H04N 23/611 |
| | | | | 348/E5.045 |
| 2012/0105647 A1* | 5/2012 | Yoshizumi | .......... | H04N 23/611 |
| | | | | 348/169 |
| 2012/0113267 A1* | 5/2012 | Ishige | ................... | H04N 23/63 |
| | | | | 348/169 |
| 2012/0200721 A1* | 8/2012 | Hara | ................... | H04N 23/667 |
| | | | | 348/208.4 |
| 2014/0320702 A1* | 10/2014 | Tsubusaki | ............. | H04N 23/61 |
| | | | | 348/240.3 |

FOREIGN PATENT DOCUMENTS

| | | | |
|---|---|---|---|
| JP | 2011-030040 A | 2/2011 |
| JP | 2011-209620 A | 10/2011 |
| JP | 2013-016924 A | 1/2013 |
| JP | 2015-011249 A | 1/2015 |
| JP | 2021-148646 A | 9/2021 |

OTHER PUBLICATIONS

Office Action issued Sep. 2, 2025, in corresponding Japanese Patent Application No. 2022-182256, with English translation (8 pages).

* cited by examiner

INFORMATION PROCESSING APPARATUS, INFORMATION PROCESSING METHOD, AND STORAGE MEDIUM

CROSS-REFERENCE TO PRIORITY APPLICATION

This application claims the benefit of Japanese Patent Application No. 2022-182256, filed on Nov. 15, 2022, which is hereby incorporated by reference herein in its entirety.

BACKGROUND OF THE INVENTION

Field of the Invention

The present invention relates to an information processing apparatus for performing tracking, an information processing method, and a storage medium.

Description of the Related Art

In recent years, the need for automatic image capturing of scenes in which there is movement, such as conferences, sports scenes, or the like, has increased in remote cameras. As a technology that realizes this automatic image capturing, a technology is known that adjusts the angle of view and keeps a tracking subject inside the angle of view by performing pan/tilt/zoom (referred to below as PTZ) operations that match the movements of the tracking subject.

In addition, for example, in the usage scene of a lecture, when a lecturer is giving an explanation using a blackboard or slides, there are cases in which both the lecturer and the targets of their explanation should be included within the screen. At this time, if the angle of view is controlled to match the explanatory gestures of the lecturer and movements in their standing position, the writing on the blackboard or the slides in the background will become difficult to see.

In order to prevent this, it is proposed that, if the tracking subject enters a specific region, the angle of view is fixed, and if they go outside of the region, the angle of view is controlled according to the composition settings (settings related to in which position inside of the screen of the target is displayed, and, at what size the target should be displayed within the screen).

In contrast, Japanese Unexamined Patent Application, First Publication No. 2021-148646 discloses a configuration in which an exit determination region of a different size than the error range is set based on the error range of the position of the terminal apparatus of the target, and exiting in relation to a monitored region is determined by the overlapping relationship between the monitored region and the exit determination region. However, if the exit determination for the subject is performed for the entirety of the image capturing angle of view, the exit determination cannot be performed unless the subject completely exits the angle of view.

Thus, in a case in which the angle of view is set if the tracking subject enters a specified region, and the angle of view is controlled according to composition settings if the tracking subject leaves the region, there is a problem in which the tracking target is lost from sight on the screen before the determination is completed and tracking cannot be performed.

SUMMARY OF THE INVENTION

The information processing apparatus according to one aspect of the present invention is an information processing apparatus comprising at least one processor or circuit configured to function as a detection unit configured to detect a predetermined target from an image that has been captured by an image capturing unit, a setting unit configured to set a predetermined region and an exit determination region that is smaller than the predetermined region in relation to the image, a determining unit configured to perform an exit determination based on whether or not the target has exited from the exit determination region, and a control unit configured to control an image capturing region of the image capturing unit according to results that have been determined by the determining unit.

Further features of the present invention will become apparent from the following description of embodiments with reference to the attached drawings.

BRIEF DESCRIPTION OF THE DRAWINGS

FIGS. 2A and 2B are diagrams for explaining composition settings according to the First Embodiment of the present application.

DESCRIPTION OF THE EMBODIMENTS

Hereafter, with reference to the accompanying drawings, favorable modes of the present invention will be described using Embodiments. In each diagram, the same reference signs are applied to the same members or elements, and a duplicate description will be omitted or simplified.

First Embodiment

Figure 1:
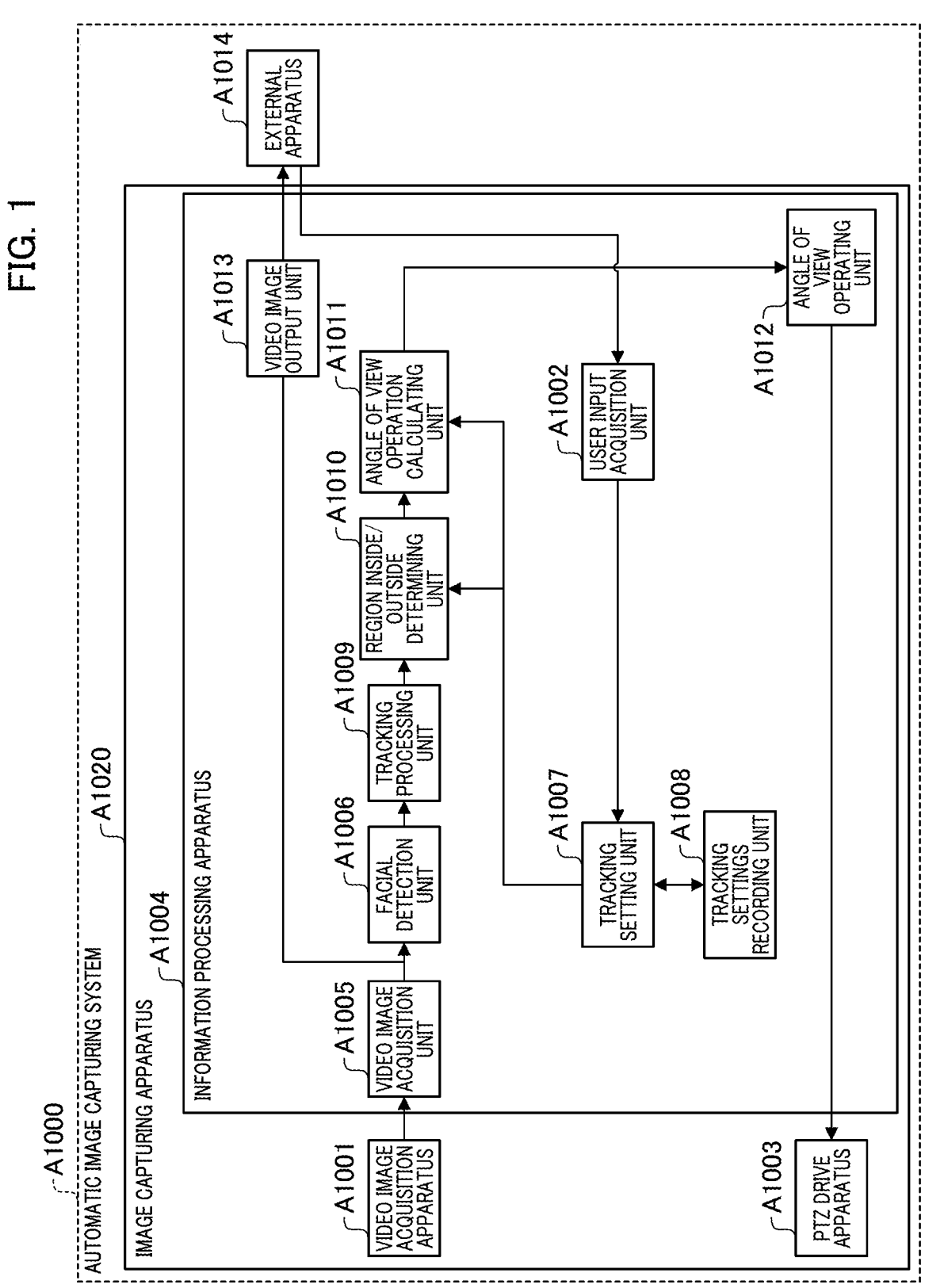
FIG. 1 is a functional block diagram of an automatic image capturing system according to a First Embodiment of the present application.
Figure 3A:
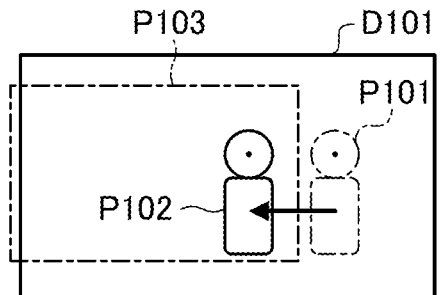
FIGS. 3A to 3D are diagrams that explain examples of the angle of view being transferred to a predetermined region and fixed when the tracking subject enters the predetermined region, the fixed angle of view being released when the tracking subject exits from the predetermined region, and angle of view control being performed according to the composition settings.
Figure 3B:
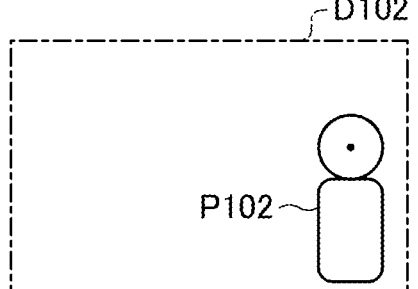
Figure 3C:
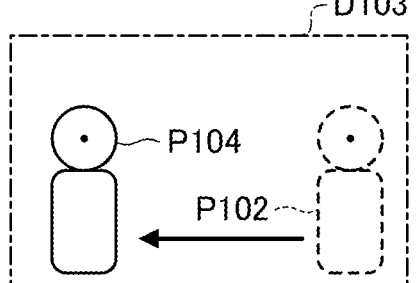
Figure 3D:
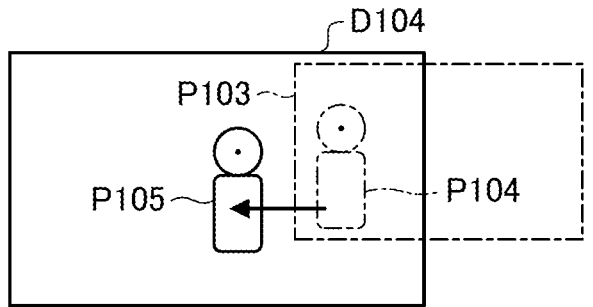

A configurational example of an automatic image capturing system A1000 according to the First Embodiment of the present invention will be explained with reference to FIG. 1. FIG. 1 is a functional block diagram of an automatic image capturing system according to the First Embodiment of the present invention.

Note that a portion of the functional blocks that are shown in FIG. 1 are realized by a CPU, or the like, that is included in the automatic image capturing system and that serves as a computer, which is not shown, executing a computer program that has been stored on a memory that serves as a storage medium, which is also not shown.

However, a portion of or the entirety thereof may also be made so as to be realized by hardware. An application specific integrated circuit (ASIC), a processor (a reconfigurable processor, or a DSP), or the like, can be used as the hardware.

In addition, each of the functional blocks that are shown in FIG. 1 do not need to be encased in the same body, and may also be configured by separate apparatuses that have been connected to each other via signal paths. Note that the above explanation in relation to FIG. 1 also applies in the same manner to FIG. 10, FIG. 15, and FIG. 19.

The automatic image capturing system A1000 of the First Embodiment has an image capturing apparatus A1020 that includes a video image acquisition apparatus A1001, a PTZ in drive apparatus A1003, and an information processing apparatus A1004, as well as an external apparatus A1014.

The image capturing apparatus A1020 and the external apparatus A1014 are connected via a network. In addition, the image capturing apparatus A1020 and the external apparatus A1014 may also be connected via a video interface.

The image capturing apparatus A1020 of the First Embodiment performs tracking processing for a predetermined target based on a video image that has been acquired from the video image acquisition apparatus A1001 and tracking settings that have been acquired from a user input acquisition unit A1002. In addition, angle of view control is also performed using the PTZ drive apparatus A1003 such that the tracking target does not leave the angle of view.

Note that, in the First Embodiment, the predetermined target for performing the tracking is a person, and, in particular, is the face of a person. Therefore, the person or the person's face is automatically tracked. However, the predetermined target for performing the tracking is not limited to being a person, and may also be an animal. Conversely, the target may also be a movable apparatus such as an automobile, an airplane, a train, a ship, or the like, and the target in the First Embodiment also includes these movable apparatuses in addition to animals.

In addition, when the angle of view control is performed, a determination as to whether or not the tracking target is within a predetermined region (a region that has been set) is performed, and the angle of view control is switched when the target is inside of the predetermined region and when the target is outside of the predetermined region. In addition, the image capturing results are displayed on the external apparatus A1014. Note that the external apparatus A1014 is a PC terminal, or the like, that includes a display element such as, for example, a liquid crystal display, or the like.

The video image acquisition apparatus A1001 is an apparatus that generates a captured video image by image capturing its surroundings, and is configured by a camera, or the like, that serves as an image capturing unit. The video image information that has been image captured by the video image acquisition apparatus A1001 is output to a facial detection unit A1006 and a video image output unit A1013 that are included in the information processing apparatus A1004.

The user input acquisition unit 1002 is a unit that acquires tracking settings from a user. The user input acquisition unit A1002 acquires settings from the external apparatus A1014, which is configured by a GUI (graphical user interface), or the like, that operates on a web browser, or the like, which is not shown. The user input acquisition unit A1002 outputs the tracking settings that have been input by the user to a tracking setting unit A1007.

Note that the user input acquisition unit A1002 functions as a setting unit that sets a predetermined region and composition in relation to an image. In this context, the composition shows a position in which the tracking subject is displayed within the screen, and the size at which they are displayed. That is, the user input acquisition unit A1002 is able to set the composition such as the display position and the display size, and the like, of the target in the image.

Note that the setting unit is not limited to the example of a user setting a predetermined region and composition in relation to an image, and may also set the predetermined region and composition according to characteristics (shape, size, velocity, acceleration), or the like, of a subject that have been detected by image recognition, or the like, or conversely based on the initial settings. In addition, the setting unit is able to set a predetermined region, an exit determination region that is smaller than the predetermined region, and an entrance determination region that is smaller than the exit determination region in relation to an image.

The PTZ drive apparatus A1003 is an apparatus that changes the angle of view, and in addition to being configured by a drive apparatus such as a motor, or the like, for performing control of the pan, tilt, and zoom, performs PTZ drive based on a PTZ control value that has been input from an angle of view operating unit A1012. Note that it is sufficient if the PTZ drive apparatus A1003 in the First Embodiment is able to perform at least one from among the three drives for pan, tilt, and zoom.

The information processing apparatus A1004 performs image analysis processing, determination processing, and the like. The information processing apparatus A1004 performs tracking processing based on coordinates for a face that have been detected using a video image that has been input, and composition settings that have been input by the user (settings relating to the display position, the display size, and the like, of the tracking subject within the screen).

In addition, in a case in which there is a tracking subject that is inside of the region that has been input by the user (the predetermined region), angle of view control is switched according to the position of the tracking subject, such that the angle of view is fixed after the angle of view has been moved to this region, and the angle of view control is performed based on the composition settings if the target exits from the predetermined region.

That is, in a case in which it has been determined that the target exists outside of the predetermined region that has been set (they do not exist inside of the predetermined region), the image capturing range (angle of view) is controlled by using the PTZ drive unit, such that the target becomes the composition that was set by the setting unit (their display position, display size, and the like, within the screen).

The information processing apparatus A1004 has a video image acquisition unit A1005, a facial detection unit A1006, the tracking setting unit A1007, a tracking settings recording unit A1008, a tracking processing unit A1009, a region inside/outside determining unit A1010, and an angle of view operation calculating unit A1011. The information processing apparatus A1004 further has an angle of view operating unit A1012, and a video image output unit A1013. The video image acquisition unit A1005 outputs the video image that has been acquired to the facial detection unit A1006 and the video image output unit A1013.

The facial detection unit A1006 performs facial detection processing for people within the video image by performing image recognition based on the video image information that has been input via the video image acquisition unit A1005. Note that any method may be used for the facial detection processing as long as it is able to detect a face, such as a template matching method, semantic segmentation, and the like.

Template matching methods and semantic segmentation are well-known technologies, and, therefore, detailed descriptions thereof will be omitted. Note that the facial detection unit A1006 detects a predetermined target from an image that has been image captured by an image capturing unit. In addition, as was described above, the target that is detected is not limited to a person and their face, and may also be an animal and its face, or a movable apparatus. The facial detection unit A1006 outputs the coordinates of the face that has been detected from each video image information to the tracking processing unit A1009.

When tracking settings have been input from the user input acquisition unit A1002, the tracking setting unit A1007 applies these tracking settings, and outputs them to the tracking settings recording unit A1008. In the First Embodiment, the tracking settings are made the two types of settings of the region settings and the composition settings. However, these may also additionally be made settings such as tracking sensitivity settings, or the like. An explanation will be given with respect to the composition settings using FIG. 2 (A) and (B).

Figures 2A, 2B:
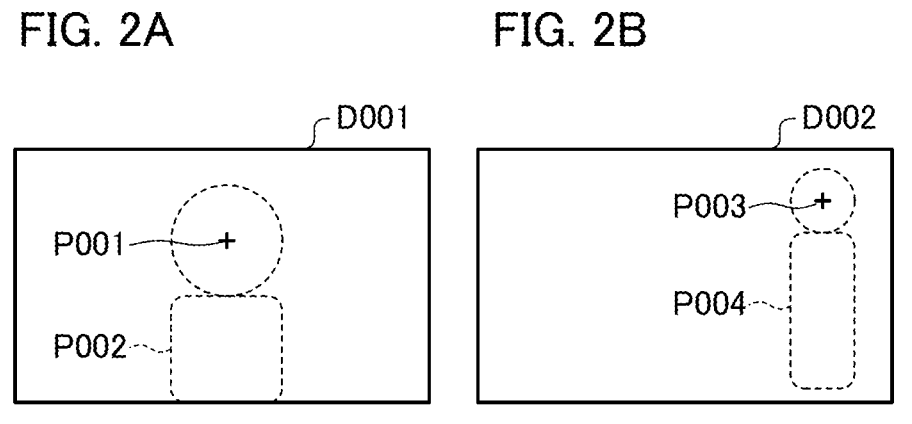

FIGS. 2A and 2B are diagrams for explaining the composition settings according to the First Embodiment of the present invention. The composition settings are for setting the position, size, and the like, of the target inside of the screen such that even if the tracking subject moves within the screen, they continue to be captured in a specific position, or such that they are maintained at a specific size even in a case in which the size of the tracking subject within the screen has changed.

FIGS. 2A and 2B are both diagrams showing examples of different composition settings, and D001 and D002 are image diagrams of each of these composition settings. P001 and P003 show the position in which the tracking target is displayed, and P002 and P004 show the size at which the tracking target is displayed. In D001, composition settings are shown in which the composition is made such that the tracking target is brought to the center of the screen, and the size of the tracking target is made such that the upper half of their body fits inside of the screen.

In D002, the composition is made such that the tracking target is brought to the upper right of the screen, and composition settings are shown such that the size of the tracking target is made so that their entire body fits inside of the screen. Switches to the region settings and the angle of view control will be explained using FIG. 3.

FIGS. 3A to 3D are diagrams that explain examples in which, when the tracking subject has entered the predetermined region, the angle of view is moved to the predetermined region and fixed, and when they have exited from the predetermined region, the fixed angle of view is released, and the angle of view control is performed according to the composition settings.

Screens D101, D102, and D103 show examples of the angle of view when the tracking subject has entered inside of the predetermined region (the region that has been set in advance by the user) P103. Screen D101 shows a state in which the tracking subject has moved to the position P102 from the position P101, wherein the position P102 is within the predetermined region (the region that has been set by the user in advance) P103.

The screen D102 is a screen in which, at this time, the angle of view of screen D101 has been changed so as to match the predetermined region P103. While the tracking subject has entered inside of the region P103, the angle of view is fixed even if the tracking subject moves within the region P103. The screen D103 shows this state. Even if the tracking subject moves from the position P102 to the position P104 within this region P103, the image capturing direction will not move, and the image capturing size will also not change. That is, the angle of view will not change.

In this manner, in a case in which it has been determined that the tracking subject that serves as the target exists inside of the predetermined region that has been set (that they have entered into the entrance determination region), the image capturing range (image capturing angle of view) is controlled using the PTZ drive apparatus such that the above-described predetermined region is included in the image capturing range. Furthermore, in this case, the image capturing range (image capturing angle of view) is controlled by the PTZ drive apparatus such that the image capturing range becomes a position and size that correspond to the above-described predetermined region.

If the tracking subject exits to the outside of the region P103, the fixed angle of view is released, and the angle of view is widened so as to capture the tracking subject. The screen D104 shows this state. By the tracking subject moving from the position P104 to the position P105, which is outside of the region P103, the image capturing angle of view is widened from the angle of view corresponding to the region P103, it is moved to match the position P105, and changed to the state in screen D104.

The tracking setting unit A1007 outputs region settings and composition settings, such as those described above, that serve as tracking settings to the region inside/outside determining unit A1010, and the angle of view operation calculating unit A1011. The tracking settings recording unit A1008 records the tracking settings that have been input from the tracking setting unit A1007. In addition, the tracking settings that have been recorded are output to the tracking setting unit A1007.

The tracking processing unit A1009 performs tracking processing based on facial information that has been input from the facial detection unit A1006. That is, in a case in which tracking processing has not been performed, the tracking processing is begun by a tracking target being selected, and, in a case in which tracking processing has already been performed, the tracking processing is performed by the detected facial information being input. Any selection method may be used as the method for selecting the tracking target as long as it is a method that is able to select one target from among a plurality of facial information.

For example, it may be made such that the face that is the closest to the center of the image is made the tracking target. Any method may be used for the tracking processing as long as it is a method that understands position information from a previous frame of the selected tracking target, and position information for the tracking target in the current frame from the input facial information. For example, the tracking also may be performed based on a position that has been predicted from the movement history of the tracking subject, and the position of the face that has been detected. The tracking processing results are output to the region inside/outside determining unit A1010.

The region inside/outside determining unit A1010 performs a determination as to whether the tracking target is inside of or outside of the predetermined region (the region that has been set) based on the tracking processing results that have been input from the tracking processing unit A1009 and the region settings that has been input from the tracking setting unit A1007.

Note that the region inside/outside determining unit A1010 performs a determination as to whether or not the target exists within a predetermined region. In addition, the determining unit performs an exit determination based on whether or not the target has exited from an exit determination region, and performs an entrance determination based on whether or not the target has entered an entrance determination region.

Figures 4A, 4B:
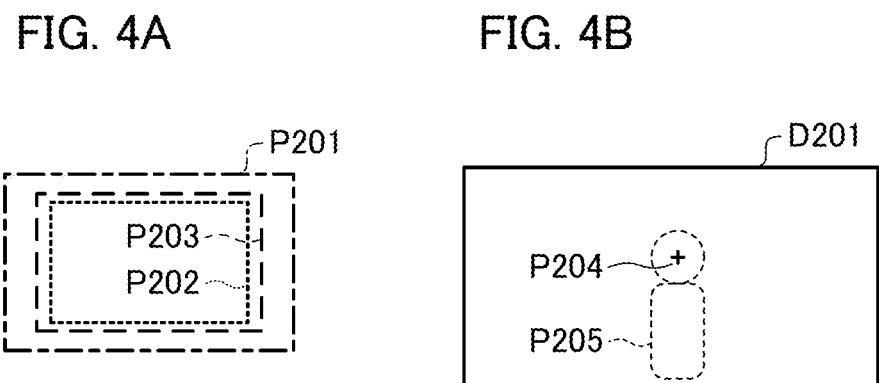
FIGS. 4A and 4B are diagrams explaining the entrance determination region and exit determination region within the region settings, and the composition settings according to the First Embodiment of the present invention.

An example of input tracking settings will be explained using FIGS. 4A and 4B. FIGS. 4A and 4B are diagrams explaining the entrance determination region and exit determination region inside of the region settings, and the composition settings according to the First Embodiment of the present invention. P201 shows the predetermined region (the region that has been set), P202 is the entrance determination region for determining if the target has entered the region P201, and P203 shows the exit determination region for determining if the target has exited from the region P201.

If the sizes of P202 and P203 are the same, in a case in which the tracking subject has come to a stop at the border of the region, the determinations for entering and exiting will be performed repeatedly. Therefore, the relationship for the size of each of these regions is made P201>P203>P202. If this relationship is maintained, the size of each of the regions may be any size.

D201 is a screen that shows an example of composition settings. P204 shows the position in which the tracking subject is displayed, and P205 shows the size at which the tracking subject is displayed. Next, the determination processing in the region inside/outside determining unit A1010 will be explained. First, whether or not the tracking subject already exits inside of the predetermined region is confirmed. In a case in which a plurality of predetermined regions is set, it is confirmed whether or not the tracking subject exists inside one of the predetermined regions.

In a case in which the tracking subject does not yet exist inside of the predetermined region, it is determined whether or not the subject has entered the predetermined region from outside of the predetermined region, and, if this is not the case, it is determined if the subject has exited from the predetermined region. An example of a determination of entrance into the predetermined region from outside of the predetermined region will be explained using FIG. 5.

Figure 5:
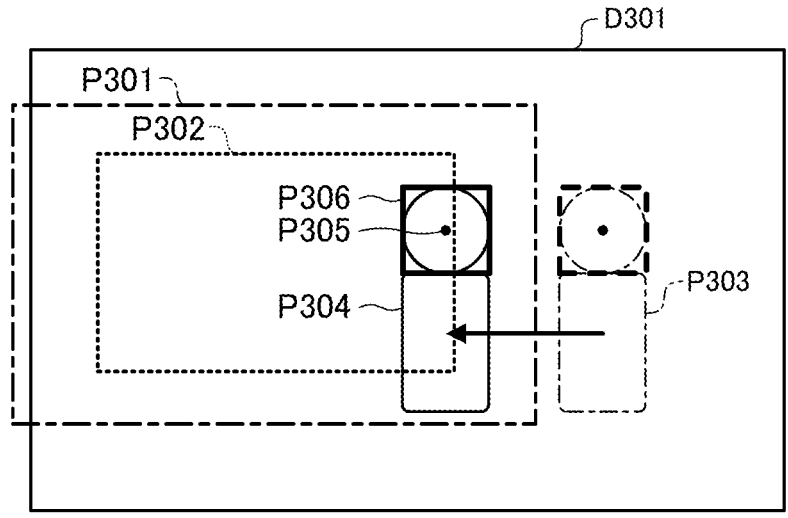
FIG. 5 is a diagram for explaining an example in which the tracking subject has entered inside of the entrance determination region within the region settings in the First Embodiment of the present invention.

FIG. 5 is a diagram for explaining an example in which, in the First Embodiment of the present invention, the tracking subject has entered inside of the entrance determination region of the predetermined region (the region settings). D301 is a screen showing the image capturing angle of view. P301 shows the predetermined region, and P302 shows the entrance determination region.

When the tracking subject has moved to the position P304 from the position P303, a case is assumed in which based on the facial detection results for the tracking subject, it has been detected that the center position P305 of the facial box P306 has moved inside of the entrance determination region P302. In this case, the region inside/outside determining unit A1010 determines that the tracking subject has entered the predetermined region (set region) P301.

In addition, the determination results and the region information are output to the angle of view operation calculating unit A1011. That is, in a case in which the center of the facial box for the target exists inside of the entrance determination region, an entrance determination is made. Note that an entrance determination may also be made in a case in which the center of their face exists inside of the entrance determination region, and, in the First Embodiment, it is made such that the center of a face includes the center of its facial box.

Figure 6:
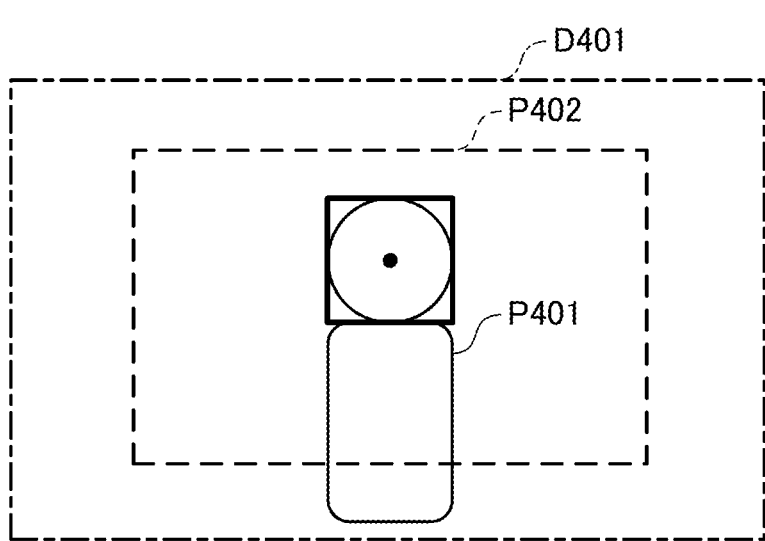
FIG. 6 is a diagram showing that the tracking subject is stopped within the region settings in the First Embodiment of the present invention.

Next, the state of a determination for when the tracking subject exists inside of the predetermined region will be explained using FIG. 6 and FIG. 7. FIG. 6 is a diagram showing that the tracking subject in the First Embodiment of the present invention is stopped inside of the predetermined region (the set region), and FIG. 7 is a diagram showing a state in which the tracking subject in the First Embodiment of the present invention has left and exited outside of the exit determination region within the predetermined region (the set region).

Figure 7:
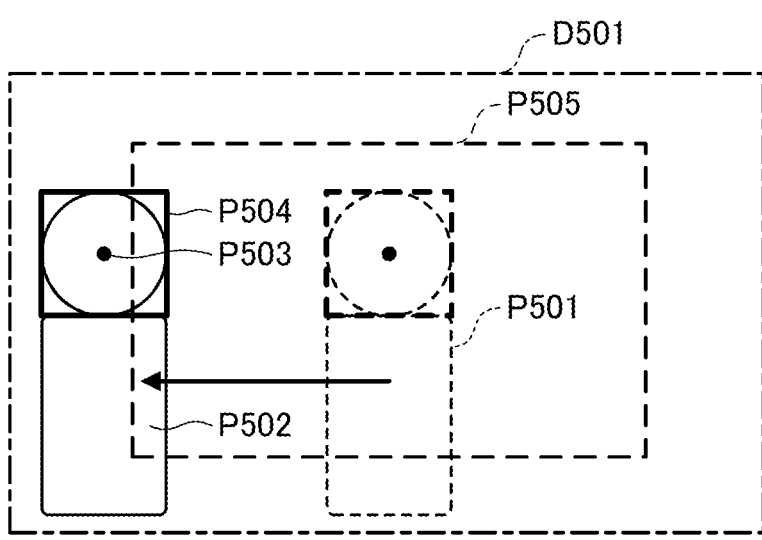
FIG. 7 is a diagram showing a state in which the tracking subject has exited outside of the exit determination region that is inside of the region settings in the First Embodiment of the present invention.

D401 in FIGS. 6 and D501 in FIG. 7 show angles of view that have been set so as to match the predetermined region P201 from FIG. 4. In FIG. 6, the position P401 of the tracking subject exists inside of the exit determination region P402, and, therefore, it is determined that the target exists within the predetermined region.

In FIG. 7, the tracking subject has moved to the position P502 from the position P501, and, as a result, it is detected that the position P503, which is the center of the facial box P504, which is the facial detection results for the tracking target P502, is outside of the exit determination region P505.

In this case, it is determined that the tracking subject has exited from the predetermined region. In addition, the determination results are output to the angle of view operation calculating unit A1011. Note that an exit determination may also be made in a case in which the center of a face exists outside of the exit determination region, and as was described above, it is made such that the center of a face includes the center of a facial box.

In this manner, the region inside/outside determining unit A1010 performs exit determinations based on whether or not the target (tracking subject) has exited from an exit determination region that is smaller than the predetermined region that has been set, and performs entrance determinations based on whether or not the target has entered an entrance determination region that is smaller than the exit determination region.

The angle of view operation calculating unit A1011 calculates an angle of view value that is controlled based on the determination results and region information that have been input from the region inside/outside determining unit, and the composition settings that have been input from the tracking setting unit A1007.

In a case in which determination results have been input in which the subject is continuously stopped inside of the predetermined region, the current angle of view is fixed (maintained), and, therefore, the same angle of view value as the present is output to the angle of view operating unit A1012. In a case in which determination results have been input in which the target has entered inside of the predetermined region from outside of the predetermined region, an angle of view value, such that the predetermined region that has been entered becomes the angle of view, is output to the angle of view operating unit A1012.

In a case in which a determination has been made in which the target has exited to outside of the predetermined region from inside of the predetermined region (in which they have exited from the exit determination region) or a determination has been made in which the target exists outside of the predetermined region, an angle of view value is calculated, such that the position and size of the tracking subject become the position and size that have been indicated in the composition settings from the current position and size within the screen. In addition, this angle of view value is output to the angle of view operating unit A1012.

The angle of view operating unit A1012 calculates a PTZ control value from the angle of view value that has been input from the angle of view operation calculating unit A1011. With respect to the calculation of the PTZ control value, any method may be used as long as the control becomes the angle of view value that has been input, and a method in which the PTZ coordinate values are directly specified may be used, or a method that specifies the direction and velocity of the pan/tilt may also be used.

The calculated PTZ control value is output to the PTZ drive apparatus A1003, and the angle of view for the image capturing apparatus is controlled. In this context, the angle of view operation calculating unit A1011 and the angle of view operating unit A1012 function as a control means that controls the image capturing range for the image capturing means according to results that have been determined by the region inside/outside determining unit A1010.

That is, the control means (the angle of view operation calculating unit A1011 and the angle of view operating unit A1012) controls the image capturing range of the image capturing means by the region inside/outside determining unit A1010 outputting the calculated PTZ control value to the PTZ drive apparatus A1003.

The video image output unit A1013 outputs the video image that has been input via the video image acquisition unit A1005 to the external apparatus A1014, such as a PC terminal, or the like. The external apparatus A1014 displays the video image that has been input from the video image output unit A1013 on a monitor.

Figure 8:
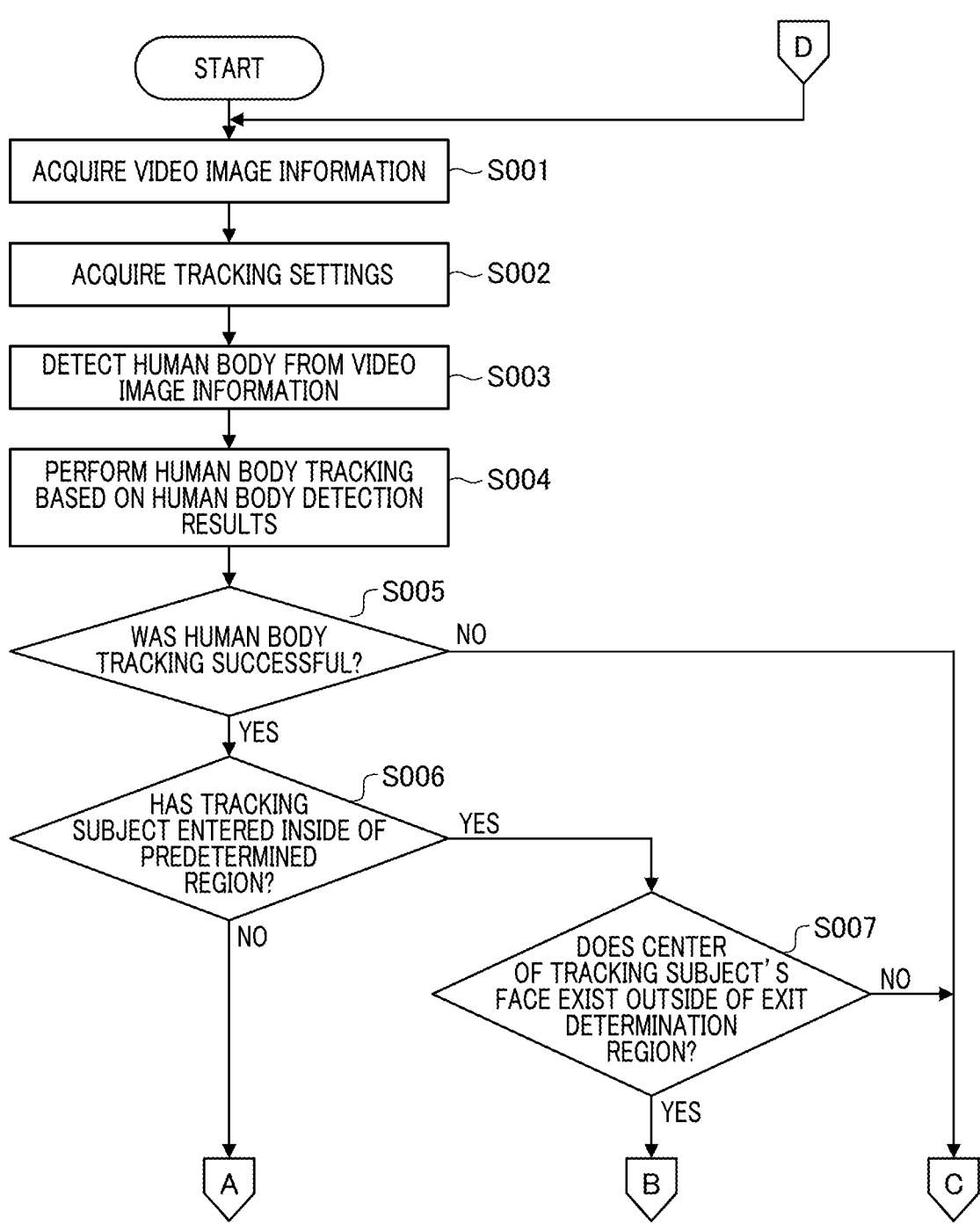
FIG. 8 is a flowchart showing the processing procedures for the automatic image capturing system according to the First Embodiment of the present invention.

Next, the procedures for performing the processing for the image capturing apparatus will be explained while referencing the flowcharts in FIG. 8 and FIG. 9. FIG. 8 is a flowchart showing processing procedures for the image capturing apparatus according to the First Embodiment of the present invention, and FIG. 9 is a flowchart showing processing procedures that are a continuation of FIG. 8.

Figure 9:
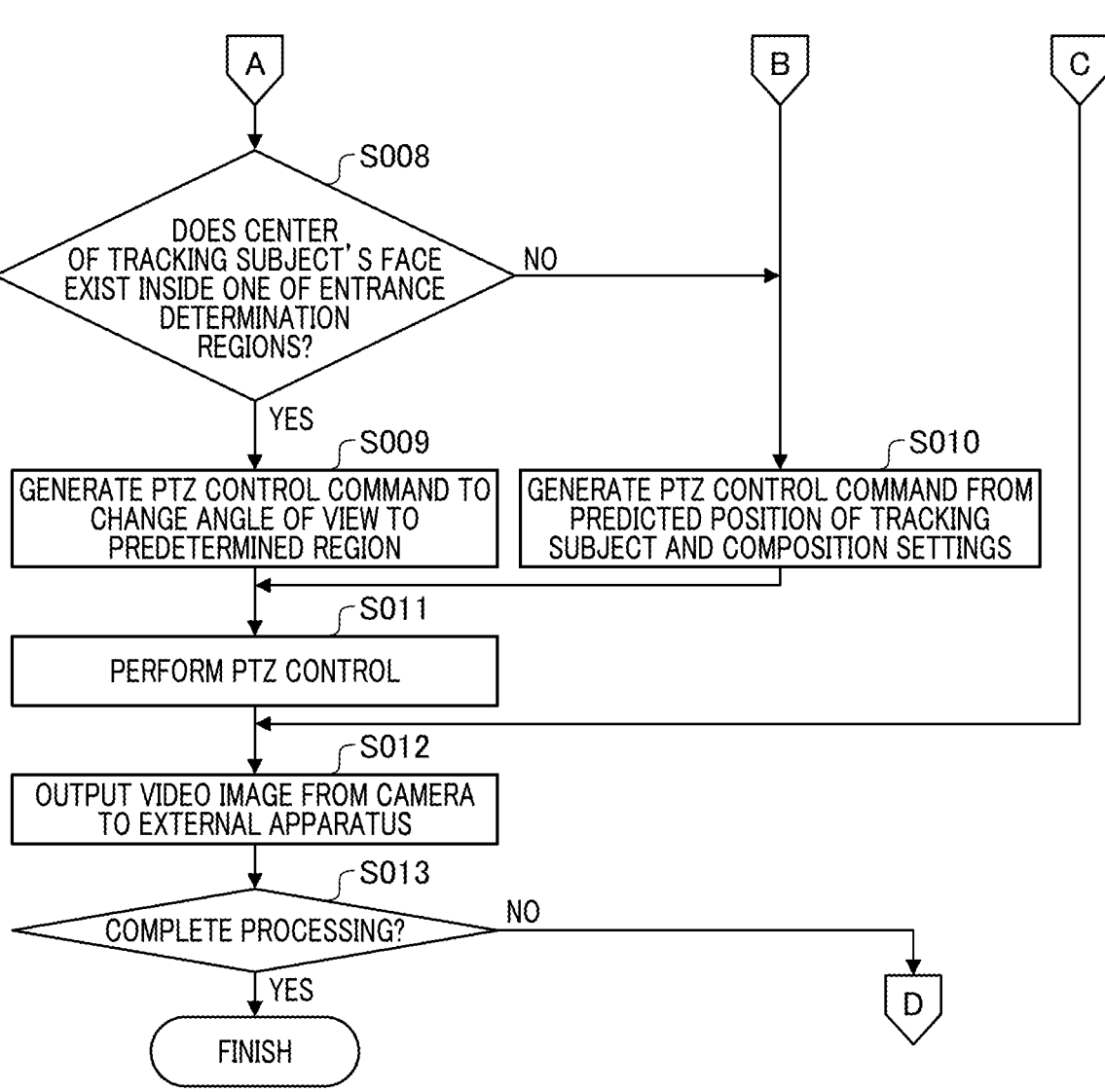
FIG. 9 is a flowchart showing processing procedures that are a continuation of FIG. 8.

Note that the operations for each step of the flowcharts in FIG. 8 and FIG. 9 are performed by the CPU serving as a computer inside of the image capturing apparatus executing a computer program that has been stored on a memory.

The flow in FIG. 8 and FIG. 9 is started upon the image capturing apparatus A1020 of the automatic image capturing system A1000 being started up by a user operation. First, during step S001, the video image acquisition unit A1005 acquires video image information from the video image acquisition apparatus A1001, and outputs this to the facial detection unit A1006 and the video image output unit A1013. Then, the processing proceeds to step S002.

During step S002, the user input acquisition unit A1002 acquires the region information and composition settings that have been set by the user (the settings showing the position and size at which the tracking subject is displayed within the screen, and the like) as well as the automatic selection settings for the tracking target, and outputs these to the tracking setting unit A1007. The tracking setting unit A1007 outputs the region information and composition settings as well as the automatic selection settings for the tracking target that have been input to the tracking settings recording unit A1008, and these are recorded.

Then, the processing proceeds to step S003. In this context, step S002 functions as a setting step that sets a predetermined region in relation to an image. Note that the setting step is able to set a predetermined region, an exit determination region that is smaller than the predetermined region, and an entrance determination region that is smaller than the exit determination region in relation to an image.

During step S003, the facial detection unit A1006 performs facial detection that serves as human body detection by performing image recognition based on the video image information that has been input. In addition, the facial information that has been detected and the video image information are output to the tracking processing unit A1009. Next, the processing proceeds to step S004. In this context, step S003 functions as a detection step for detecting a predetermined target from an image that has been image captured by an image capturing unit.

During step S004, the tracking setting unit A1007 selects a tracking target from the facial information that serves as the human body detection results that have been input, and performs tracking processing. In addition, the coordinate information for the tracking subject, which serves as the tracking processing results, is output to the region inside/outside determining unit A1010. Next, the processing proceeds to step S005.

During step S005, the tracking setting unit A1007 determines whether or not the tracking processing for a human body (a face) has succeeded. In a case of Yes for step S005, the processing proceeds to step S006. In a case of No for step S005, the processing proceeds to step S012 of FIG. 9 via C of FIG. 8.

During step S006, the region inside/outside determining unit A1010 determines whether or not the tracking subject has entered inside of the predetermined region. This determination processing is processing that first confirms whether or not the tracking subject already exists inside of the predetermined region. Note that, in a case in which a plurality of predetermined regions has been set, the tracking processing confirms whether or not the tracking subject exists inside one of the predetermined regions.

In the case of Yes for step S006, that is, in case in which the tracking subject exists inside of the predetermined region, the processing proceeds to step S007. In a case of No for step S006, that is, in a case in which the tracking subject does not exist within the predetermined region, the processing proceeds to step S008 of FIG. 9 via A of FIG. 8.

During step S007, the region inside/outside determining unit A1010 determines whether or not the center of the facial box (or face) of the tracking subject exists outside of the exit determination region. That is, during step S007, it is determined whether or not the tracking subject, which existed inside of the predetermined region during step S006, has exited from the exit determined region of the predetermined region.

In a case of Yes for step S007, that is, in a case in which the tracking subject has exited from the exit determination region inside of the predetermined region, the processing proceeds to step S010 of FIG. 9 via B of FIG. 8. In a case of No for step S007, that is, in a case in which the tracking subject has not exited from the exit determination region inside of the predetermined region, and has continued to be stopped inside of the predetermined region, this information is output to the angle of view operation calculating unit A1011, and the processing proceeds to step S012 of FIG. 9 via C of FIG. 8.

During step S008 of FIG. 9, the region inside/outside determining unit A1010 determines whether or not the center of the facial box for the tracking subject exists within one of the entrance determination regions, and outputs the determination results to the angle of view operation calculating unit A1011. That is, during step S008, it is determined whether or not the tracking subject, which did not exist inside of the predetermined region during step S006, has entered the entrance determination region inside of the predetermined region.

In the case of Yes for step S008, that is, a case in which the tracking subject has entered the entrance determination region inside of the predetermined region, the processing proceeds to step S009. In a case of No for step S008, that is, in a case in which the tracking subject has not entered the entrance determination region inside of the predetermined region, the processing proceeds to step S010.

In this context, step S006 to step S008 function as a determining step for determining whether or not a target exists within a predetermined region. In addition, this determining step performs an exit determination based on whether or not the target has exited from an exit determination region that is smaller than the predetermined region, and performs an entrance determination based on whether or not the subject has entered an entrance determination region that is smaller than the exit determination region.

During step S009, the angle of view operation calculating unit A1011 calculates an angle of view control value for changing the angle of view to the predetermined region that the tracking target has entered, and outputs this to the angle of view operating unit A1012, then generates a PTZ control command. Next, the processing proceeds to step S011.

In contrast, during step S010, the angle of view operation calculating unit A1011 calculates an angle of view control value for showing the tracking subject within the screen according to a predicted position of the tracking subject and composition settings that have been acquired from the tracking setting unit A1007, and outputs this to the angle of view operating unit A1012, then generates a PTZ control command, Next, the processing proceeds to step S011.

During step S011, the angle of view operating unit A1012 outputs the PTZ control command to the PTZ drive apparatus A1003 based on the angle of view control value that has been input from the angle of view operation calculating unit A1011. In addition, the PTZ drive apparatus A1003 changes the image capturing angle of view by performing PTZ drive. Next, the processing proceeds to step S012. In this context, step S011 functions as a control step for controlling the image capturing range of the image capturing unit according to results that have been determined by the determining step.

During step S012, the video image output unit A1013 outputs the video image information that has been input to the external apparatus A1014. Next, the processing proceeds to step S013.

During step S013, it is determined whether or not a stop operation that turns the image capturing apparatus A1020 off has been performed by a user operation. In the case of No for step S013, the processing returns to step S001 of FIG. 8 via D of FIG. 9, and, in a case of Yes for step S013, the automatic image capturing processing is completed, and the flow in FIG. 8 and FIG. 9 is completed.

In the manner described above, in a case in which tracking processing is performed based on facial detection in the First Embodiment, using an entrance determination region and an exit determination region having difference sizes inside of the predetermined region, it is determined that a subject has entered the predetermined region when the center of the facial box (or face) of the tracking subject has entered inside of the entrance determination region. In addition, it is determined that the target has exited the predetermined region when the center of the facial box (or face) of the tracking subject has gone outside of the exit determination region. It is thereby possible to perform angle of view control while continuing the tracking without losing sight of the face of the target at the time of an exit determination.

Second Embodiment

Figure 10:
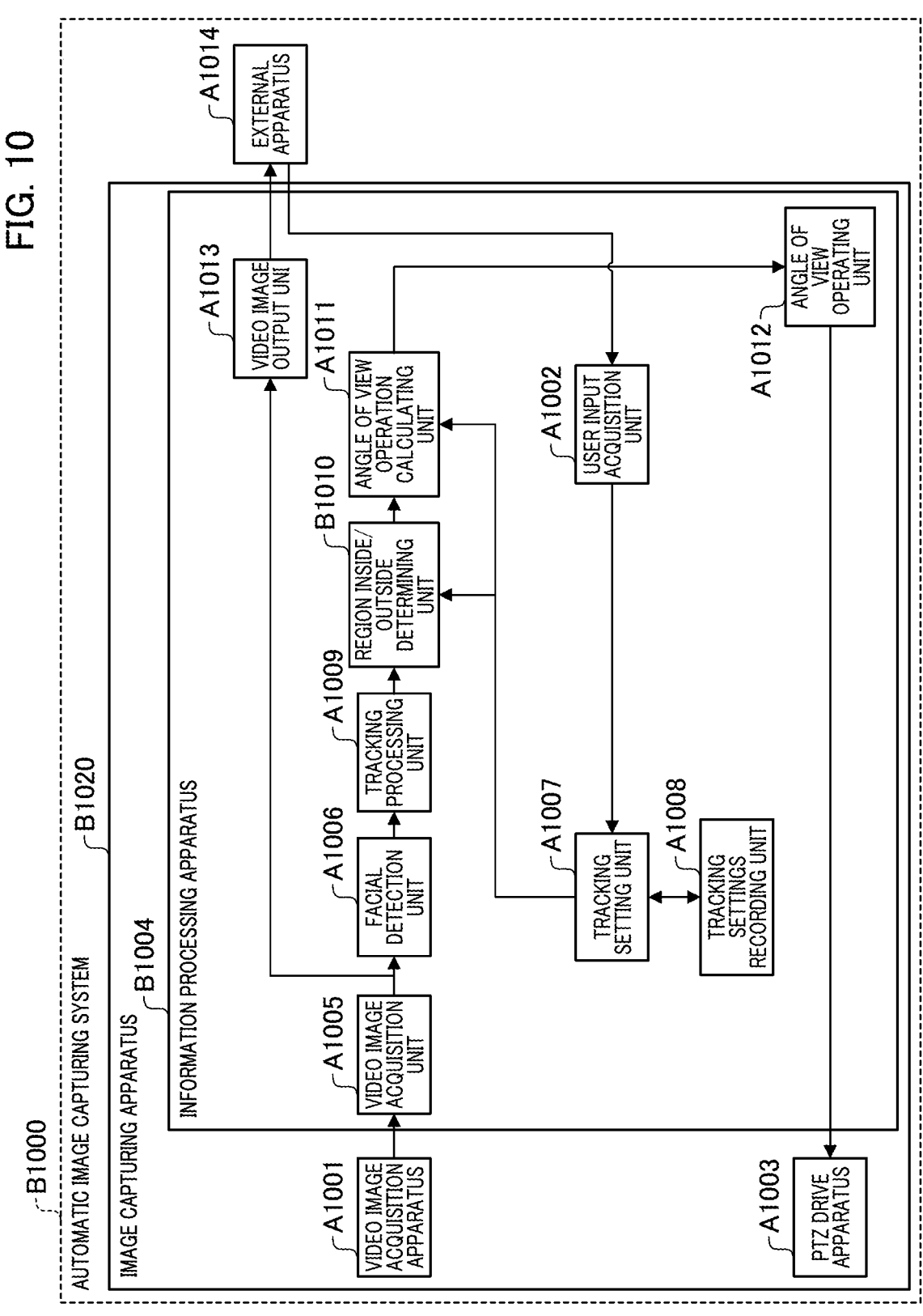
FIG. 10 is a functional block diagram of an automatic image capturing system according to a Second Embodiment of the present invention.

An explanation will be given with respect to a configurational example of an automatic image capturing system B1000 according to the Second Embodiment of the present invention with reference to FIG. 10. FIG. 10 is a functional block diagram of the automatic image capturing system according to the Second Embodiment of the present invention.

In order to prevent the face of the tracking subject from being lost from sight on the screen at the time of an exit determination due to the size of the tracking subject within the screen, the Second Embodiment dynamically changes the sizes of the exit determination region and the entrance determination region according to the size of the face of the tracking subject.

The automatic image capturing system B1000 performs tracking processing based on the video image that has been acquired via the video image acquisition unit A1005 and the tracking settings that have been acquired from the user input acquisition unit A1002, and performs angle of view control using the PTZ drive apparatus A1003, such that the tracking target does not leave the angle of view.

At this time, a determination is performed as to whether or not the tracking target is inside of the predetermined region (the region that has been set), and the angle of view control is switched when the target is inside of the predetermined region and when the target is outside of the predetermined region. In addition, the image capturing results are displayed on the external apparatus A1014. The automatic image capturing system B1000 has an image capturing apparatus B1020 that includes an image acquisition apparatus A1001, a PTZ drive apparatus A1003, and an information processing apparatus B1004, as well as an external apparatus A1014.

The image capturing apparatus and the external apparatus A1014 are connected via a network. In addition, the image capturing apparatus and the external apparatus A1014 may also be connected via a video interface.

The information processing apparatus B1004 performs image analysis processing, determination processing, and the like. The information processing apparatus B1004 performs tracking processing based on the coordinates for the face that have been detected using the video image that has been input, and the composition settings that have been set. In addition, the angle of view control is switched according to the position of the tracking subject such that in a case in which the tracking subject is inside of the predetermined region (the region that has been set), the angle of view is fixed after having been changed to the angle of view for the predetermined region, and, if the tracking subject exits from the predetermined region, angle of view control is performed based on the composition settings.

The information processing apparatus B1004 has a video image acquisition unit A1005, a facial detection unit A1006, a tracking setting unit A1007, a tracking settings recording unit A1008, a tracking processing unit A1009, a region inside/outside determining unit B1010, and an angle of view operation calculating unit A1011. The information processing apparatus B1004 further has an angle of view operating unit A1012, and a video image output unit A1013.

The region inside/outside determining unit B1010 performs determinations as to whether the tracking target is inside or outside of the predetermined region based on the tracking processing results that have been input from the tracking processing unit A1009, and the region settings that have been input from the tracking setting unit.

In order to prevent the face of the tracking subject from being lost from sight on the screen at the time of an exit determination due to the size of the tracking subject within the screen, in the Second Embodiment, the sizes of the exit determination region and the entrance determination region are dynamically changed according to the size of the face of the tracking subject. This state is explained in FIG. 11 and FIG. 12.

Figure 11:
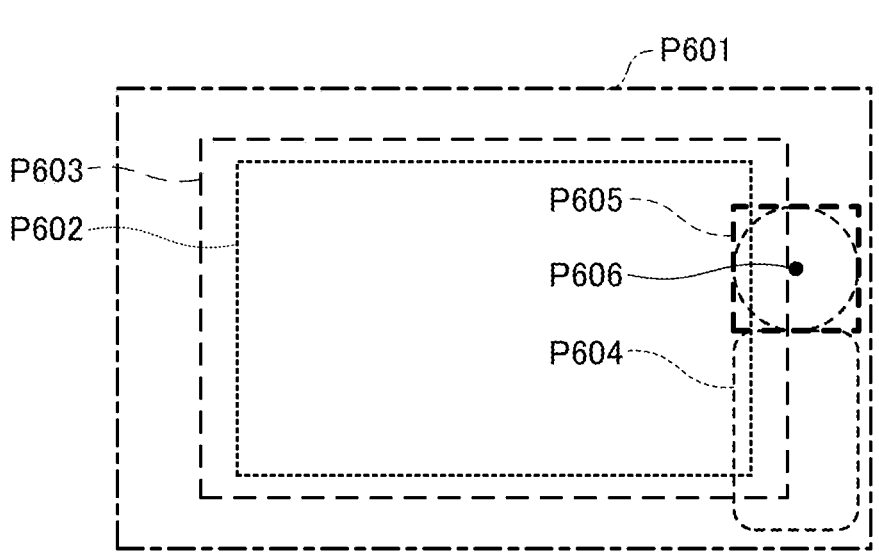
FIG. 11 is a diagram showing a state in which the sizes of the exit determination region and the entrance determination region are determined when the face of the tracking subject is small in the Second Embodiment of the present invention.
Figure 12:
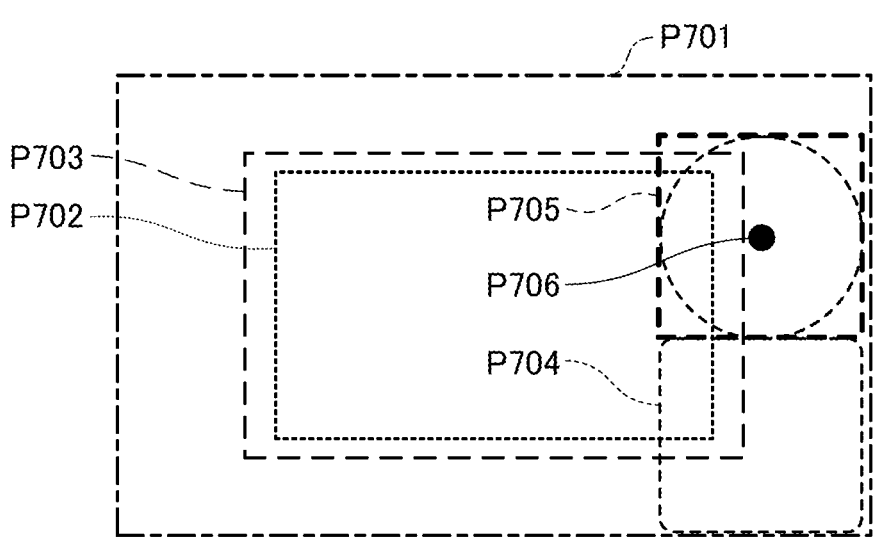
FIG. 12 is a diagram showing a state in which the sizes of the exit determination region and the entrance determination are determined when the face of the tracking subject is large in the Second Embodiment of the present invention.

FIG. 11 is a diagram showing the state in which the sizes of the exit determination region and the entrance determination region are decided when the face of the tracking subject is small, in the Second Embodiment of the present invention. In addition, FIG. 12 is a diagram showing the state in which the sizes of the exit determination region and the entrance determination region are decided when the face of the tracking subject is large in the Second Embodiment of the present invention.

P601 shows the predetermined region (the region that has been set), P604 shows the tracking subject, P605 shows the facial box that serves as the facial detection results for the tracking subject, and P606 shows the central position of the facial box for the tracking subject. In addition, P602 shows the entrance determination region, and P603 shows the exit determination region. In this context, in order to make it easy to understand how it is decided what sizes the entrance determination region and the exit determination region should be, an example is shown in which the tracking subject is at the edge of the screen. The sizes of the regions, however, also can be decided in cases in which the subject is not in this position.

In the Second Embodiment, as is shown in FIG. 11, the difference in sizes for the exit determination region P603 and the predetermined region (the region that has been set) P601 are set such that, for example, this becomes a size that is larger than half of the length of a side of the facial box P605 for the tracking subject P605.

The entrance determination region P602 is set so as to be smaller than the exit determination region P603. In contrast, even in a case such as that in FIG. 12, wherein the size of the tracking subject is large, the size of the exit determination region is dynamically set in the same manner. In FIG. 12, P701 shows the predetermined region (the region that has been set), P704 shows the tracking subject, P705 shows the facial box for the tracking subject, and P706 shows the central position for the facial box for the tracking subject.

As is shown in FIG. 11, the difference in sizes between the exit determination region P703 and the predetermined region (the region that has been selected) P701 is set so as to be, for example, a size that is larger than half of the length of a side of the facial box P705 of the tracking subject P704.

The entrance determination region P702 is set so as to be smaller than the exit determination region P703. The other determination processing that occurs in the region inside/ outside determining unit B1010 is the same as that in the region inside/outside determining unit A1010. In addition, the blocks other than that for the region inside/outside determining unit B1010 are the same as those in the First Embodiment, and, therefore, explanations thereof will be omitted.

Figure 13:
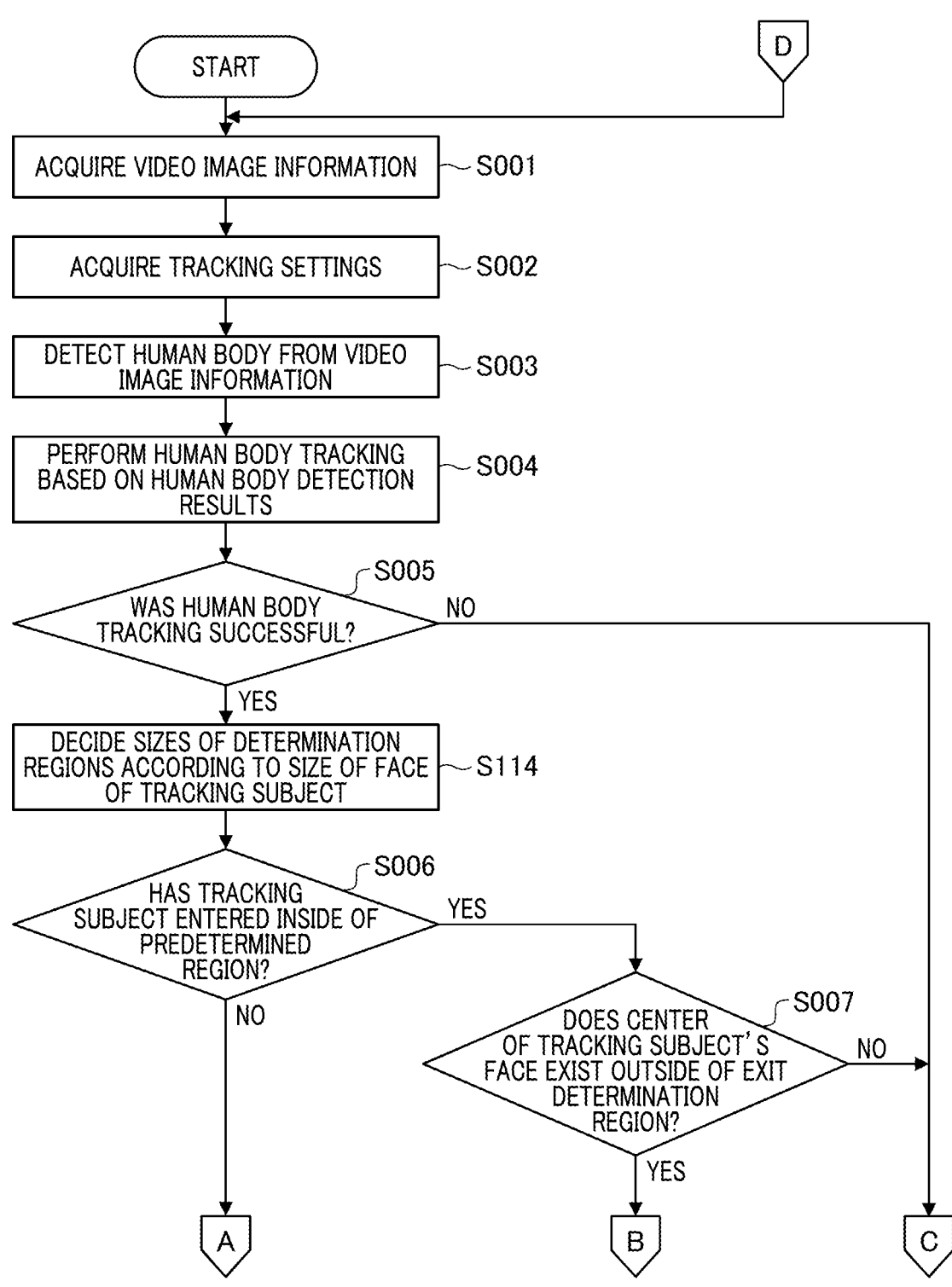
FIG. 13 is a flowchart showing the processing procedures for an automatic image capturing system according to the Third Embodiment of the present invention.

Next, the procedures for performing the processing for the image capturing apparatus will be explained while referencing the flowcharts in FIG. 13 and FIG. 14. FIG. 13 is a flowchart showing the processing procedures for the image capturing apparatus according to the Second Embodiment of the present invention, and FIG. 14 is a flowchart showing processing procedures that are a continuation of FIG. 13.

Figure 14:
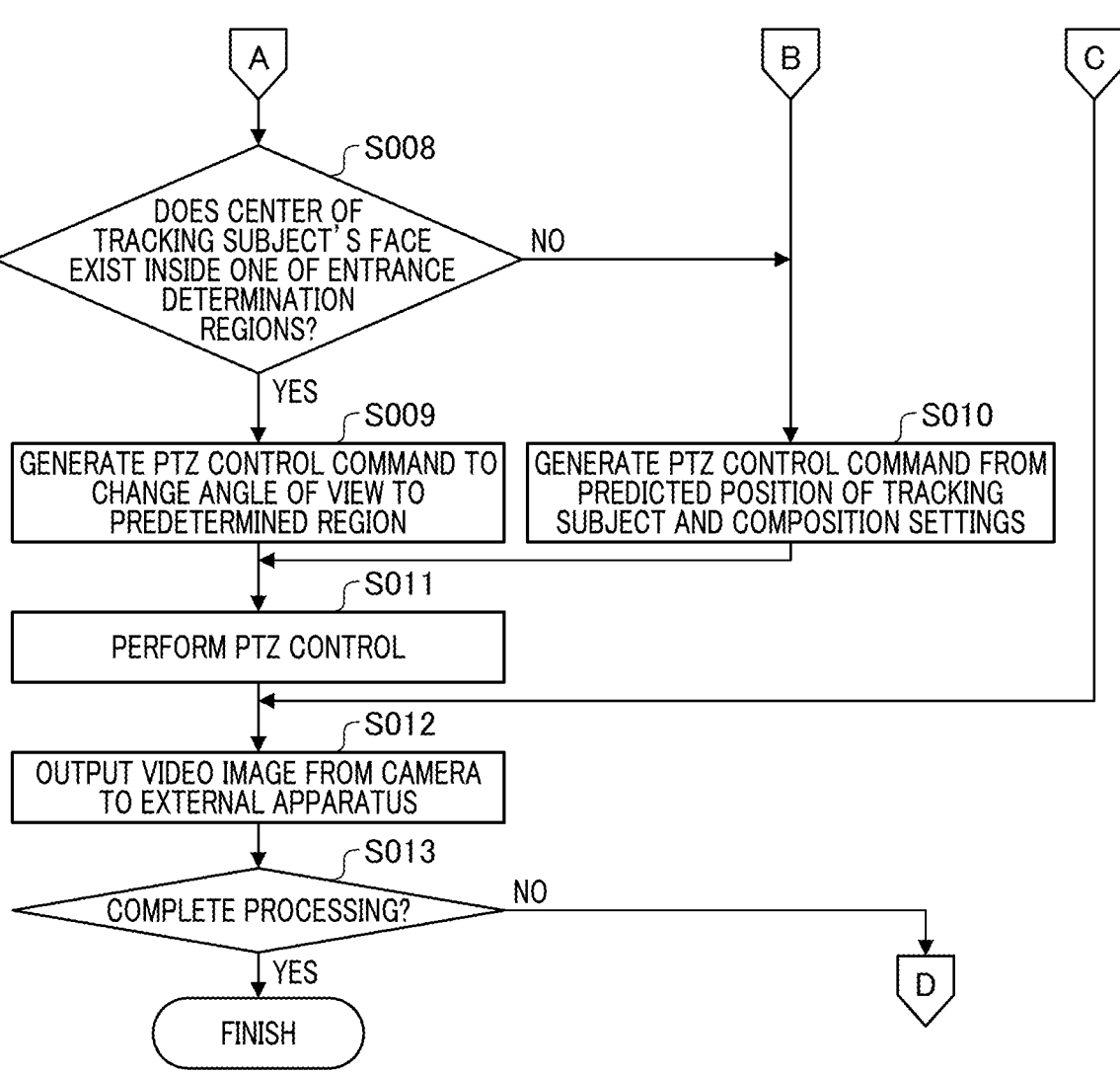
FIG. 14 is a flowchart showing the processing procedures that are a continuation of FIG. 13.

Note that the operations for each step of the flowcharts in FIG. 13 and FIG. 14 are performed by the CPU, or the like, that serves as computer inside of the image capturing apparatus executing a computer program that has been stored on a memory.

The flow in FIG. 13 and FIG. 14 is started upon the image capturing apparatus B1020 of the automatic image capturing system B1000 being started up by a user operation. First, during step S001, the video image acquisition unit A1005 acquires video image information from the video image acquisition apparatus A1001, and outputs this to the facial detection unit A1006 and the video image output unit A1013. Next, the processing proceeds to step S002.

During step S002, the user input acquisition unit A1002 acquires the region information and composition settings (settings showing the position at which the tracking subject is displayed and the size at which the tracking subject is displayed in the screen) that have been set by the user, and the automatic selection settings for the tracking target, and outputs these to the tracking setting unit A1007. The tracking setting unit A1007 outputs the region information and composition settings that have been input, and the automatic selection settings for the tracking target to the tracking settings recording unit A1008, and these are recorded. Next, the processing proceeds to step S003.

During step S003, the facial detection unit A1006 performs facial detection that serves as human body detection by performing image recognition based on the video image information that has been input. The facial information that has been detected and the video image information are output to the tracking processing unit A1009. Next, the processing proceeds to step S004.

During step S004, the tracking setting unit A1007 selects a tracking target from the facial information that serves as the human body detection results that have been input, and performs tracking processing. In addition, the coordinate information for the tracking subject, which serves as the tracking processing results, is output to the region inside/outside determining unit B1010. Next, the processing proceeds to step S005.

During step S005, the tracking setting unit A1007 determines whether or not the tracking processing for a human body (a face) has succeeded. In a case of Yes for step S005, the processing proceeds to step S114. In a case of No step S005, the processing proceeds to step S012 of FIG. 14 via C of FIG. 13.

During step S114, the region inside/outside determining unit B1010 dynamically decides the sizes of the entrance determination region and the exit determination region of the predetermined region according to the size of the face of the tracking subject. Next, the processing proceeds to step S006.

That is, in the Second Embodiment, the sizes of the entrance determination region and the exit determination region are changed according to the size of the target within the image capturing range. Note that the size of at least one of the entrance determination region or the exit determination region may also be changed according to the size of the target within the image capturing range.

During step S006, the region inside/outside determining unit B1010 determines whether or not the tracking subject has entered into the predetermined region. In the case of Yes for step S006, that is, in case in which the tracking subject exists inside of the predetermined region, the processing proceeds to step S007. In a case of No for step S006, that is, in a case in which the tracking subject does not exist within the predetermined region, the processing proceeds to step S007 of FIG. 14 via A of FIG. 13.

During step S007, the region inside/outside determining unit B1010 determines whether or not the center of the facial box (or face) of the tracking subject exists outside of the exit determination region. That is, during step S007, it is determined whether or not the tracking target, which existed inside of the predetermined region during step S006, has exited from the exit determination region of the predetermined region.

In the case of Yes for step S007, that is, in a case in which the tracking subject has exited from the exit determination region inside of the predetermined region, the processing proceeds to step S010 of FIG. 14 via B of FIG. 13. In the case of No for step S007, that is, in a case in which the tracking subject has not exited from the exit determination region inside of the predetermined region, and has continued to be stopped inside of the predetermined region, this information is output to the angle of view operation calculating unit A1011, and the processing proceeds to step S012 of FIG. 14 via C of FIG. 13.

During step S008 of FIG. 14, the region inside/outside determining unit B1010 determines whether or not the center of the facial box for the tracking subject exists within one of the entrance determination regions, and outputs the determination results to the angle of view operation calculating unit A1011. That is, during step S008, it is determined whether or not the tracking subject, which did not exist inside of the predetermined region during step S006, has entered the entrance determination region inside of the predetermined region.

In the case of Yes for step S008, that is, a case in which the tracking subject has entered the entrance determination region inside of the predetermined region, the processing proceeds to step S009. In a case of No for step S008, that is, in a case in which the tracking subject has not entered the entrance determination region inside of the predetermined region, the processing proceeds to step S010.

During step S009, the angle of view operation calculating unit A1011 calculates an angle of view control value for changing the angle of view to the predetermined region, which the tracking target has entered, and outputs this to the angle of view operating unit A1012, then generates a PTZ control command. Next, the processing proceeds to step S011.

In contrast, during step S010, the angle of view operation calculating unit A1011 calculates an angle of view control value for showing the tracking target within the screen according to a predicted position of the tracking subject and composition settings that have been acquired from the tracking setting unit A1007, and outputs this to the angle of view operating unit A1012, then generates a PTZ control command, Next, the processing proceeds to step S011.

During step S011, the angle of view operating unit A1012 outputs the PTZ control command to the PTZ drive apparatus based on the angle of view control value that has been input from the angle of view operation calculating unit A1011. In addition, the PTZ drive apparatus A1003 changes the image capturing angle of view by performing PTZ drive. Next, the processing proceeds to step S012.

During step S012, the video image output unit A1013 outputs the video image information that has been input to the external apparatus A1014. Next, the processing proceeds to step S013.

During step S013, it is discerned whether or not a stop operation that turns the image capturing apparatus A1020 off has been performed by a user operation. In the case of No for step S013, the processing returns to step S001 of FIG. 13 via D of FIG. 14, and, in a case of Yes for step S013, the automatic image capturing processing is completed, and the flow in FIG. 13 and FIG. 14 is completed.

In the above-described manner, in the Second Embodiment, in a case in which the tracking processing is performed based on facial detection, the sizes of the entrance determination region and the exit determination region are dynamically changed according to the size of the face of the tracking subject that is positioned inside of the predetermined region.

In addition, an entrance determination is made in a case in which the center of the facial box (or face) of the tracking subject has entered into the center of the inside of the entrance determination region, and an exit determination is made in a case in which the center of the facial box (or face) of the tracking subject has left the outside of the exit determination region. It is thereby possible to perform angle of view control, while continuing tracking, without losing sight of the target's face at the time of an exit determination.

Third Embodiment

Figure 15:
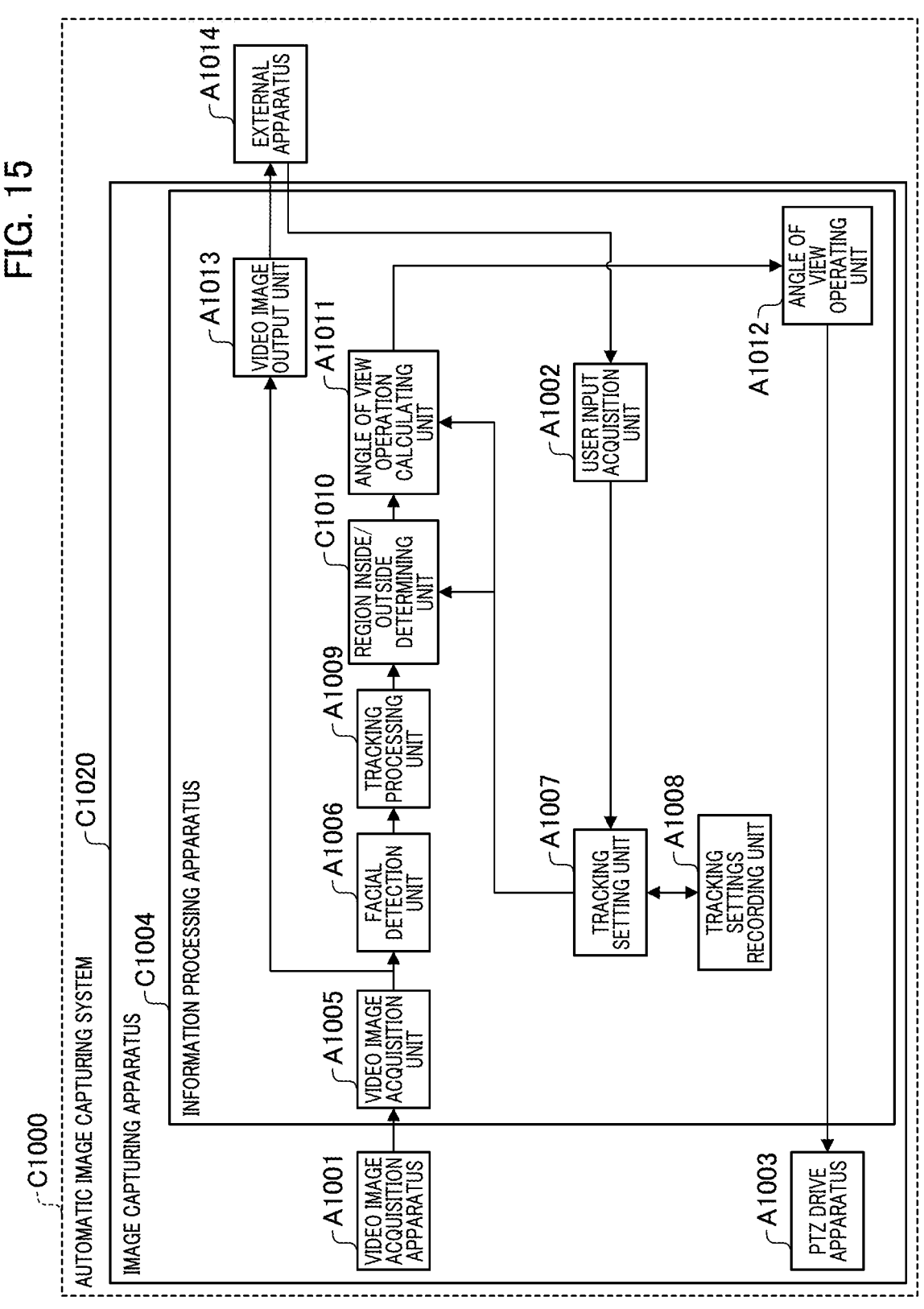
FIG. 15 is a functional block diagram of an automatic image capturing system according to the Third Embodiment of the present invention.

Next, an explanation will be given with respect to the automatic image capturing system C1000 according to the Third Embodiment of the present invention with reference to FIG. 15. FIG. 15 is a functional block diagram of the automatic image capturing system C1000 according to the Third Embodiment of the present invention.

In the Third Embodiment, a plurality of predetermined regions is set, and the Third Embodiment is processing in order to seamlessly switch the fixed angle of view control in a case in which the tracking subject has moved into a region that overlaps with the plurality of predetermined regions.

The automatic image capturing system C1000 of the Third Embodiment has an image capturing apparatus C1020 that includes a video image acquisition apparatus A1001, and a PTZ drive apparatus A1003, and an information processing apparatus C1004, as well as an external apparatus A1014.

The image capturing apparatus and the external apparatus A1014 are connected via a network. In addition, the image capturing apparatus and the external apparatus A1014 may also be connected via a video interface.

The image capturing apparatus of the Third Embodiment performs tracking processing based on a video image that has been acquired from the video image acquisition apparatus A1001, and tracking settings that have been acquired from the user input acquisition unit A1002. In addition, the image capturing apparatus performs angle of view control using the PTZ drive apparatus A1003 such that the tracking target does not leave the angle of view.

In addition, when performing the angle of view control, a determination is performed as to whether or not the tracking target is inside of the predetermined region that has been set, and the angle of view control is switched at times when the target is inside of the predetermined region and at times when they are outside of the predetermined region. In addition, the image capturing results are displayed on the external apparatus A1014.

The information processing apparatus C1004 performs tracking processing based on the coordinates for a face that has been detected using the video image that has been input, and the composition settings that have been input by the user. In addition, the angle of view control is switched according to the position of the tracking subject such that, in a case in which the tracking subject is within the region that has been input by the user, the angle of view is moved to that region and then the angle of view is fixed, and angle of view control is performed based on the composition settings if the tracking target exits from the predetermined region.

The information processing apparatus C1004 has a video image acquisition unit A1005, a facial detection unit A1006, a tracking setting unit A1007, a tracking settings recording unit A1008, a tracking processing unit A1009, an region inside/outside determining unit C1010, and an angle of view operation calculating unit A1011. The information processing apparatus C1004 additionally further has an angle of view operating unit A1012, and a video image output unit A1013.

The region inside/outside determining unit C1010 performs determinations as to if the tracking target is inside of or outside of the predetermined region based on the tracking processing results that have been input from the tracking processing unit A1009 and the region settings that have been input from the tracking setting unit.

In the Third Embodiment, the fixed angle of view control is seamlessly switched in cases in which the tracking subject has moved into a region that overlaps with the plurality of predetermined regions, and, therefore, when the tracking subject exits from the predetermined region, it is determined whether or not they are inside of the entrance determination region for another predetermined region.

Figure 16:
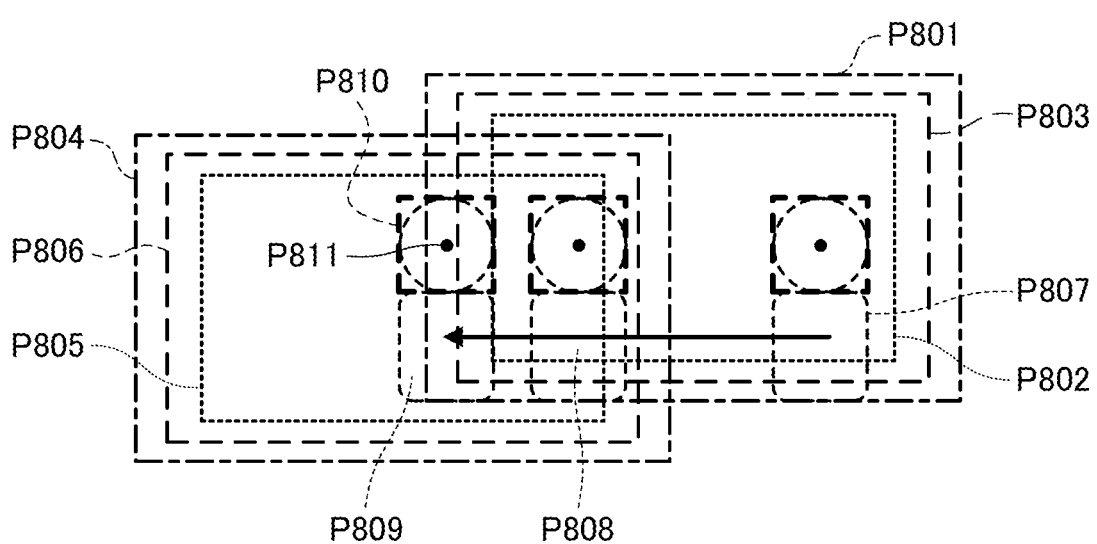
FIG. 16 is a diagram explaining a state of a region inside/outside determination for a case in which the tracking subject has moved to a region that overlaps with the region settings according to the Third Embodiment of the present invention.

This state will be explained using FIG. 16. FIG. 16 is a diagram explaining the state of a region inside/outside determination for a case in which the tracking subject has moved into a region that overlaps with the plurality of predetermined regions according to the Third Embodiment of the present invention.

Settings have been made such that a first predetermined region P801 overlaps with a second predetermined region P804. The entrance determination regions for each of the predetermined regions P801 and P804 are P802 and P805, and the exit determination regions for each of these are P803 and P806. When the tracking subject moves from the position P807 to the position P808, it is determined that they exist inside of the first predetermined region P801.

Next, when they move from the position P808 to the position P809, the central position P811 of the facial box P810 of the tracking subject P809 exists outside of the exit determination region P803 of the first predetermined region P801 that has been set. Therefore, it is determined that the target has exited outside of the first predetermined region P801.

However, in contrast, the central position P811 exists inside of the entrance determination region P805 of the second predetermined region P804, and, therefore, it is determined that they have entered into the second predetermined region P804. In this manner, in the Third Embodiment, in a case in which a plurality of predetermined regions has been set, it is made such that the angle of view control is seamlessly switched after it has been determined that the target has exited the predetermined region by determining whether or not they have entered another predetermined region.

All other determination operations are the same as the operations for the region inside/outside determining unit B1010 and, therefore, explanations thereof will be omitted. In addition, the functions for the other blocks are the same as those in the First Embodiment and the Second Embodiment, and, therefore, explanations thereof will be omitted.

Figure 17:
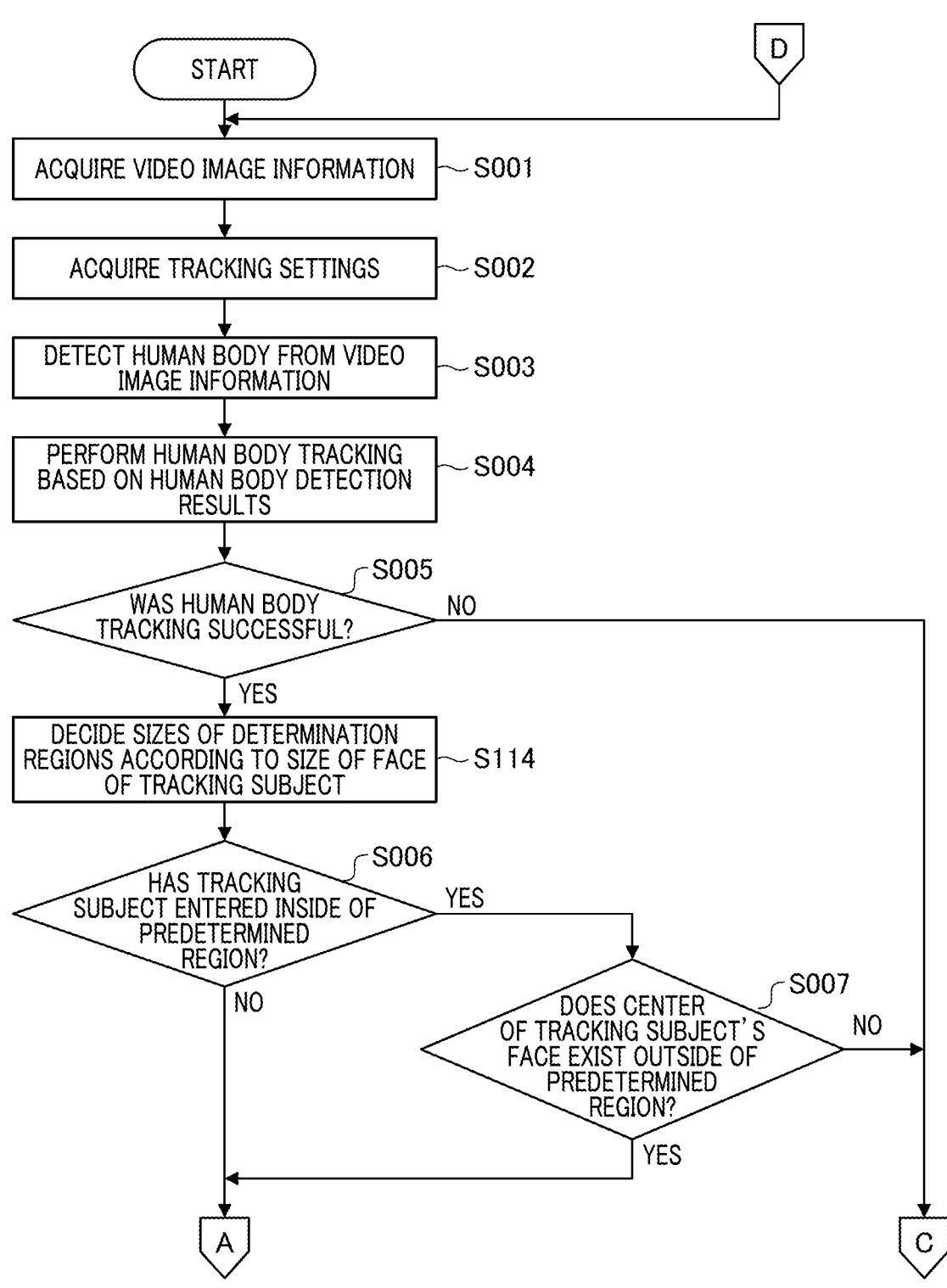
FIG. 17 is a flowchart showing processing procedures for the automatic image capturing system according to the Third Embodiment of the present invention.

Next, the procedures for performing the processing for the image capturing apparatus will be explained while referencing FIG. 17 and FIG. 18. FIG. 17 is a flowchart showing the processing procedures for an image capturing apparatus according to the Third Embodiment of the present invention, and FIG. 18 is a flowchart showing processing procedures that are a continuation of FIG. 17.

Figure 18:
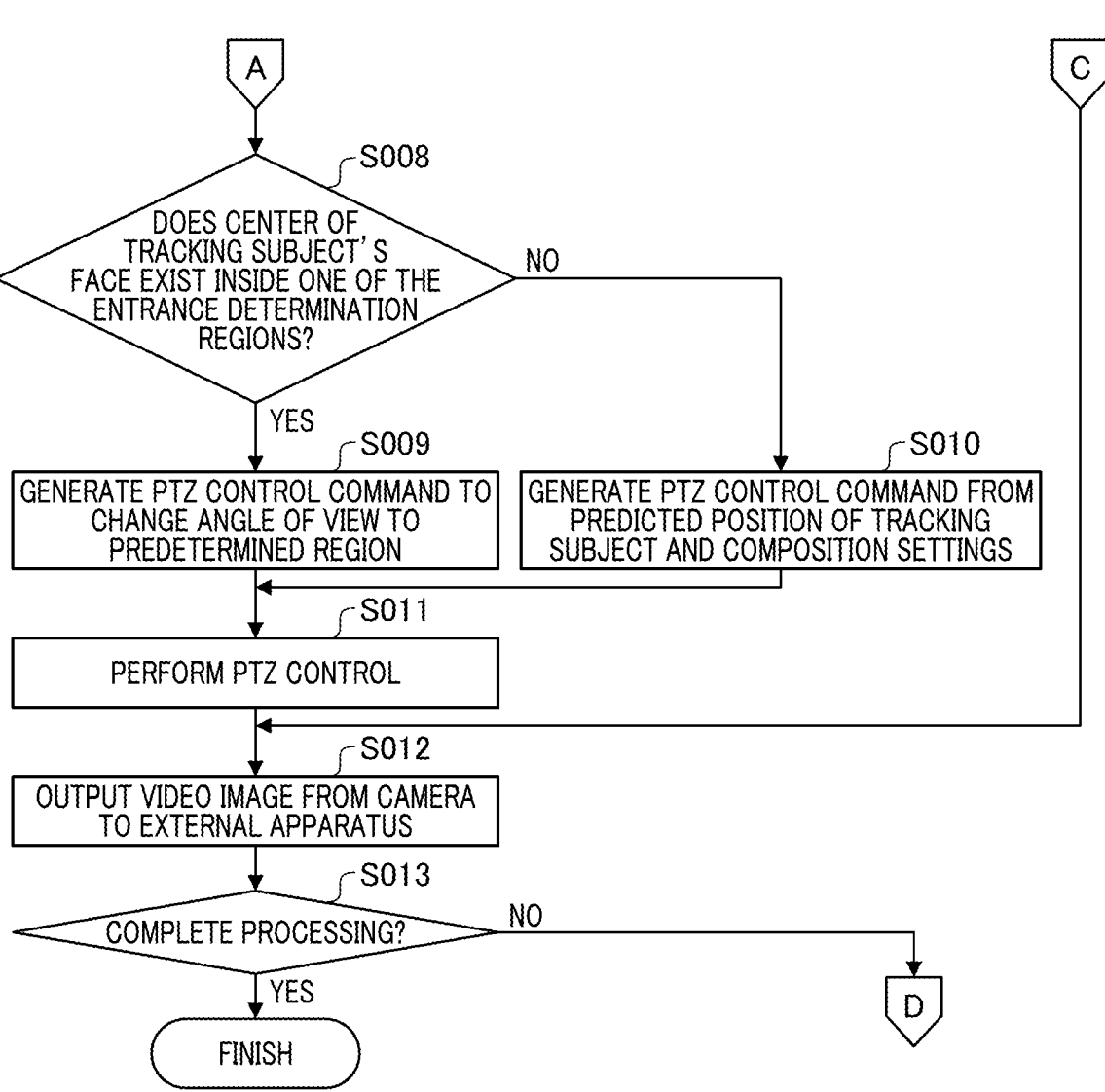
FIG. 18 is a flowchart showing processing procedures that are a continuation of FIG. 17.

Note that, the operations for each step of the flowcharts in FIG. 17, and FIG. 18 are performed by the CPU, or the like, that serves as a computer inside of the image capturing apparatus executing a computer program that has been stored on a memory.

The flow in FIG. 17 and FIG. 18 is started when the image capturing apparatus of the automatic image capturing system C1000 is started up by a user operation. First, during step S001, the video image acquisition unit A1005 acquires video image information from the video image acquisition apparatus A1001, and outputs this to the facial detection unit A1006, and the video image output unit A1013. Next, the processing proceeds to step S002.

During step S002, the user input acquisition unit A1002 acquires the region information and composition settings (settings showing the position at which the tracking subject is displayed and the size at which the tracking subject is displayed in the screen) that have been set by the user, and the automatic selection settings for the tracking target, and outputs these to the tracking setting unit A1007. The tracking setting unit A1007 outputs the region information and composition settings that have been input, and the automatic selection settings for the tracking target to the tracking settings recording unit A1008, and these are recorded. Next, the processing proceeds to step S003.

During step S003, the facial detection unit A1006 performs facial detection that serves as human body detection by performing image recognition based on the video image information that has been input. In addition, the facial information that has been detected and the video image information are output to the tracking processing unit A1009. Next, the processing proceeds to step S004.

During step S004, the tracking setting unit A1007 selects a tracking target from the facial information that has been input, and performs tracking processing. In addition, the coordinate information for the tracking subject, which serves as the tracking processing results, is output to the region inside/outside determining unit C1008. Next, the processing proceeds to step S005.

During step S005, the tracking setting unit A1007 determines whether or not the tracking processing for a human body (a face) has succeeded. In a case of Yes for step S005, the processing proceeds to step S114. In a case of No for step S005, the processing proceeds to step S012 of FIG. 18 via C of FIG. 17.

During step S114, the region inside/outside determining unit C1008 dynamically decides the sizes of the entrance determination region and the exit determination region of the predetermined region according to the size of the face of the tracking subject. This processing is the same as that in the Second Embodiment. Note that, in the Third Embodiment, the present step is not essential. Next, the processing proceeds to step S006.

During step S006, the region inside/outside determining unit C1008 determines whether or not the tracking subject has entered inside of the predetermined region. This determination processing is processing that first confirms whether or not the tracking subject already exists inside of the predetermined region.

Note that, in a case in which a plurality of predetermined regions has been set, it is confirmed whether or not the tracking subject exists inside one of the predetermined regions. In a case of Yes for step S006, that is, in case in which the tracking subject exists inside of the predetermined region, the processing proceeds to step S007. In a case of No for step S006, that is, in a case in which the tracking subject does not exist within the predetermined region, the processing proceeds to step S008 of FIG. 18 via A of FIG. 17.

During step S007, the region inside/outside determining unit C1008 determines whether or not the center of the facial box (or face) of the tracking subject exists outside of the exit determination region. That is, during step S007, it is determined whether or not the tracking target, which existed inside of the predetermined region during step S006, has exited from the exit determination region inside of the predetermined region.

In a case of Yes for step S007, that is, in a case in which the tracking subject has exited from the exit determination region inside of the predetermined region, the processing proceeds to step S008 of FIG. 18 via A of FIG. 17. In a case of No for step S007, that is, in a case in which the tracking subject has not exited from the exit determination region inside of the predetermined region, and has continued to be stopped inside of the predetermined region, this information is output to the angle of view operation calculating unit A1011, and the processing proceeds to step S012 of FIG. 18 via C of FIG. 17.

During step S008 of FIG. 18, the region inside/outside determining unit C1008 determines whether or not the center of the facial box (or the face) of the tracking subject exists within one of the entrance determination regions, and outputs the determination results to the angle of view operation calculating unit A1011. That is, during step S008, it is determined whether or not the tracking subject, which did not exist inside of the predetermined region during step S006, has entered the entrance determination region inside of the predetermined region.

In the case of Yes for step S008, that is, a case in which the tracking subject has entered the entrance determination region inside of the predetermined region, the processing proceeds to step S009. In a case of No for step S008, that is, in a case in which the tracking subject has not entered the entrance determination region inside of the predetermined region, the processing proceeds to step S010.

During step S009, the angle of view operation calculating unit A1011 calculates an angle of view control value for changing the angle of view to the predetermined region that the tracking target has entered, and outputs this to the angle of view operating unit A1012, then generates a PTZ control command. Next, the processing proceeds to step S011.

In contrast, during step S010, the angle of view operation calculating unit A1011 calculates an angle of view control value for showing the tracking target within the screen according to a predicted position of the tracking subject and composition settings that have been acquired from the tracking setting unit A1007, and outputs this to the angle of view operating unit A1012, then generates a PTZ control command. Next, the processing proceeds to step S011.

During step S011, the angle of view operating unit A1012 outputs the PTZ control command to the PTZ drive apparatus based on the angle of view control value that has been input from the angle of view operation calculating unit A1011. In addition, the PTZ drive apparatus A1003 changes the image capturing angle of view by performing PTZ drive. Next, the processing proceeds to step S012.

During step S012, the video image output unit A1013 outputs the video image information that has been input to the external apparatus A1014. Next, the processing proceeds to step S013.

During step S013, it is discerned whether or not a stop operation that turns the image capturing apparatus off has been performed by a user operation. In the case of No during step S013, the processing returns to step S001 of FIG. 17 via D of FIG. 18, and, in a case of Yes during step S013, the automatic image capturing processing is completed, and the flow in FIG. 17 and FIG. 18 is completed.

In the above-described manner, in the Third Embodiment, in a case in which the tracking subject has moved into a region that overlaps with the plurality of predetermined regions, it is possible to seamlessly switch the angle of view control immediately after the subject has exited from one of the predetermined regions by determining whether or not they have entered another, overlapping predetermined region.

Fourth Embodiment

Figure 19:
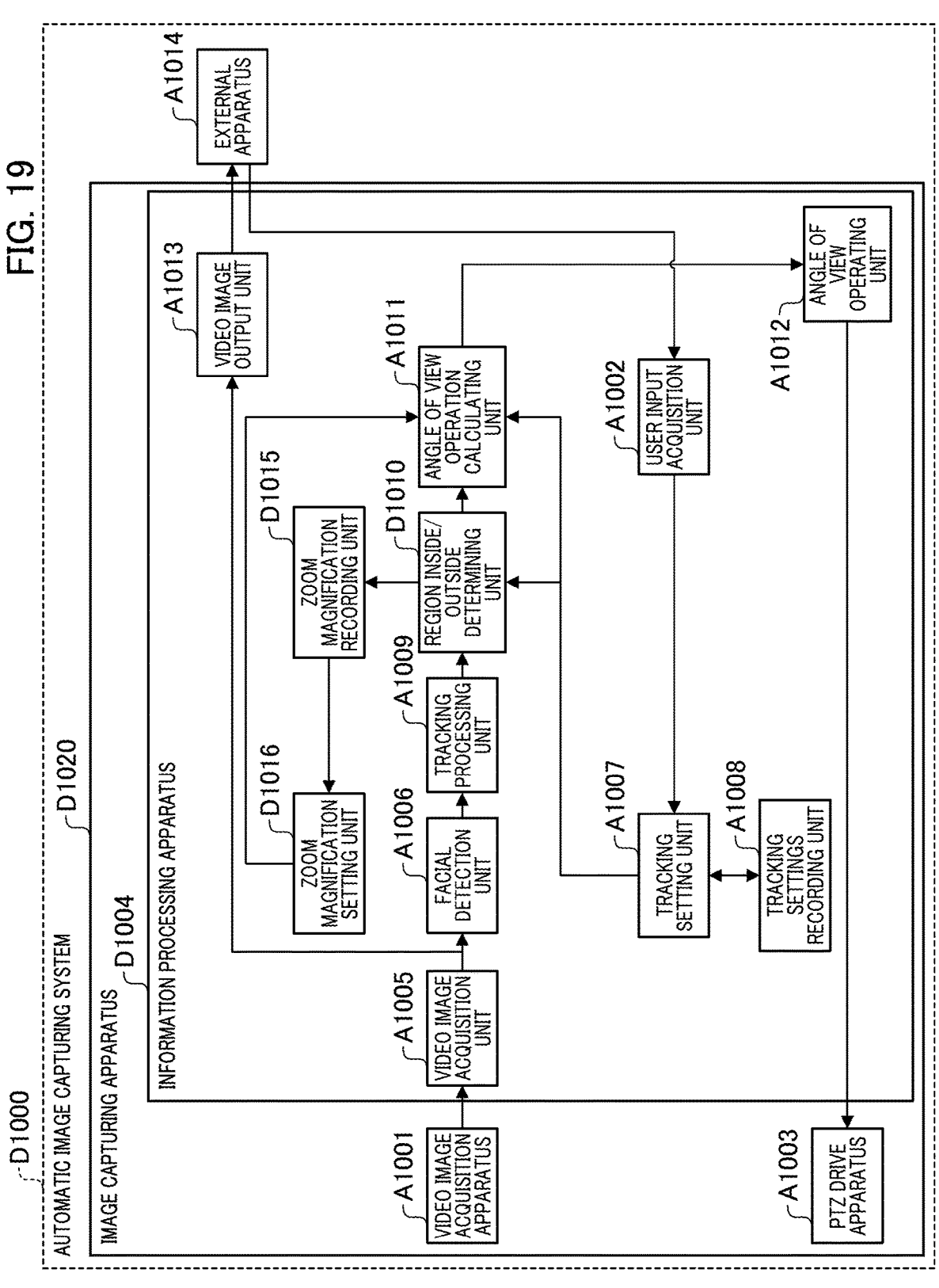
FIG. 19 is a functional block diagram of an automatic image capturing system according to a Fourth Embodiment of the present invention.

The automatic image capturing system D1000 according to the Fourth Embodiment of the present invention will be explained with reference to FIG. 19. FIG. 19 is a functional block diagram of the automatic image capturing system according to the Fourth Embodiment of the present invention.

In the Fourth Embodiment, processing is performed that performs control such that there are almost no changes to the zoom magnification before the tracking subject enters the predetermined region and after they have exited from the predetermined region.

The automatic image capturing system D1000 of the Fourth Embodiment has an image capturing apparatus D1020 including a video image acquisition apparatus A1001, a PTZ drive apparatus A1003, and an information processing apparatus D1004, as well as an external apparatus A1014.

The image capturing apparatus and the external apparatus A1014 are connected via a network. In addition, the image capturing apparatus and the external apparatus A1014 may also be connected via a video interface.

The image capturing apparatus of the Fourth Embodiment performs tracking processing based on the video image that has been acquired from the video image acquisition apparatus A1001 and the tracking settings that have been acquired from the user input acquisition unit A1002. In addition, the image capturing apparatus performs angle of view control such that the tracking target does not leave the angle of view using the PTZ drive apparatus A1003.

In addition, when performing angle of view control, a determination as to whether or not the tracking target is inside of the predetermined region that has been set is performed, and the angle of view control is switched when the target is inside of the predetermined region and when the target is outside of the predetermined region. In addition, the image capturing results are displayed on the external apparatus A1014.

The information processing apparatus D1004 performs image analysis processing, determination processing, and the like. The information processing apparatus D1004 performs tracking processing based on the coordinates for a face that have been detected using the video image that has been input, and the composition settings that have been input by the user.

In addition, the angle of view control is switched according to the position of the tracking subject such that, in a case in which the tracking subject is inside of the region that has been input by the user (the predetermined region), the angle of view is changed to this region and then the angle of view is fixed, and the angle of view is controlled based on the composition settings if the target exits from the predetermined region.

The information processing apparatus D1004 has a video image acquisition unit A1005, a facial detection unit A1006, a tracking setting unit A1007, a tracking settings recording unit A1008, a tracking processing unit A1009, a region inside/outside determining unit D1010, a zoom magnification recording unit D1015, and a zoom magnification setting unit D1016. The information processing apparatus D1004 further has an angle of view operation calculating unit D1011, an angle of view operating unit A1012, and a video image output unit A1013.

The region inside/outside determining unit D1010 performs determinations as to whether the tracking subject is inside of or outside of the predetermined region based on the tracking processing results that have been input from the tracking processing unit A1009, and the region settings and composition settings that have been input from the tracking setting unit. Note that, from among the composition settings, the adjustment of the size at which the tracking subject is displayed within the screen can be turned off.

This is used when the user would like to perform image capturing while maintaining the zoom magnification from when the image capturing was started, or the like. That is, if the angle of view control is performed based on the composition settings when the tracking subject has exited the predetermined region after they have entered the predetermined region and fixing angle of view control has been performed for maintaining the angle of view, the zoom magnification will change before they enter the predetermined region and after they exit the predetermined region.

In the Fourth Embodiment, control is performed such that the zoom magnification does not change before the tracking subject enters the predetermined region and after they have exited the predetermined region, and, therefore, the zoom magnification for the image capturing angle of view from when the tracking subject has entered the predetermined region is recorded.

For example, as was shown in FIG. 5, when the tracking subject moves from P303 to P304 and enters the predetermined region, the zoom magnification for D301, which is the image capturing angle of view from before entrance into the predetermined region is recorded in the zoom magnification recording unit D1015. All other region determining operations are the same as the operations for the region inside/outside determining unit B1010, and, therefore, an explanation thereof has been omitted.

The zoom magnification recording unit D1015, which serves as a zoom magnification setting unit, records the zoom magnification that has been input from the region inside/outside determining unit D1010, and outputs this to the zoom magnification setting unit D1016. The zoom magnification setting unit D1016 sets the zoom magnification for the video image acquisition apparatus A1001 to approximately the same zoom magnification as the zoom magnification from before the target entered the predetermined region. The zoom magnification setting unit D1016 outputs the zoom magnification that has been set to the angle of view operation calculating unit D1011.

The angle of view operations calculation unit D1011 calculates the angle of view value to be controlled based on the determination results and region information that have been input from the region inside/outside determining unit D1010, the composition settings that have been input from the tracking setting unit A1007, and the zoom magnification that has been input from the zoom magnification setting unit D1026.

A case is assumed in which, when it has been determined that the tracking subject has exited to outside of the predetermined region from inside of the predetermined region, automatic adjustments to the size at which the tracking subject is displayed within the screen in the composition settings are off. In this case, the angle of view control value is calculated based on the zoom magnification that has been read out from the zoom magnification recording unit D1015, and the settings for the position in which a person will be displayed within the screen, which have been input from the tracking setting unit A1007.

In contrast, in a case in which automatic adjustments to the size are not turned off, the angle of view control value will be calculated based on the composition settings that have been input from the tracking setting unit A1007. The calculations for the angle of view control value in other cases are the same as those made by the angle of view operation calculating unit A1011 and, therefore, explanations thereof will be omitted. In addition, the functions for the other blocks are the same as those in the First Embodiment, and, therefore, explanations thereof will also be omitted.

Figure 20:
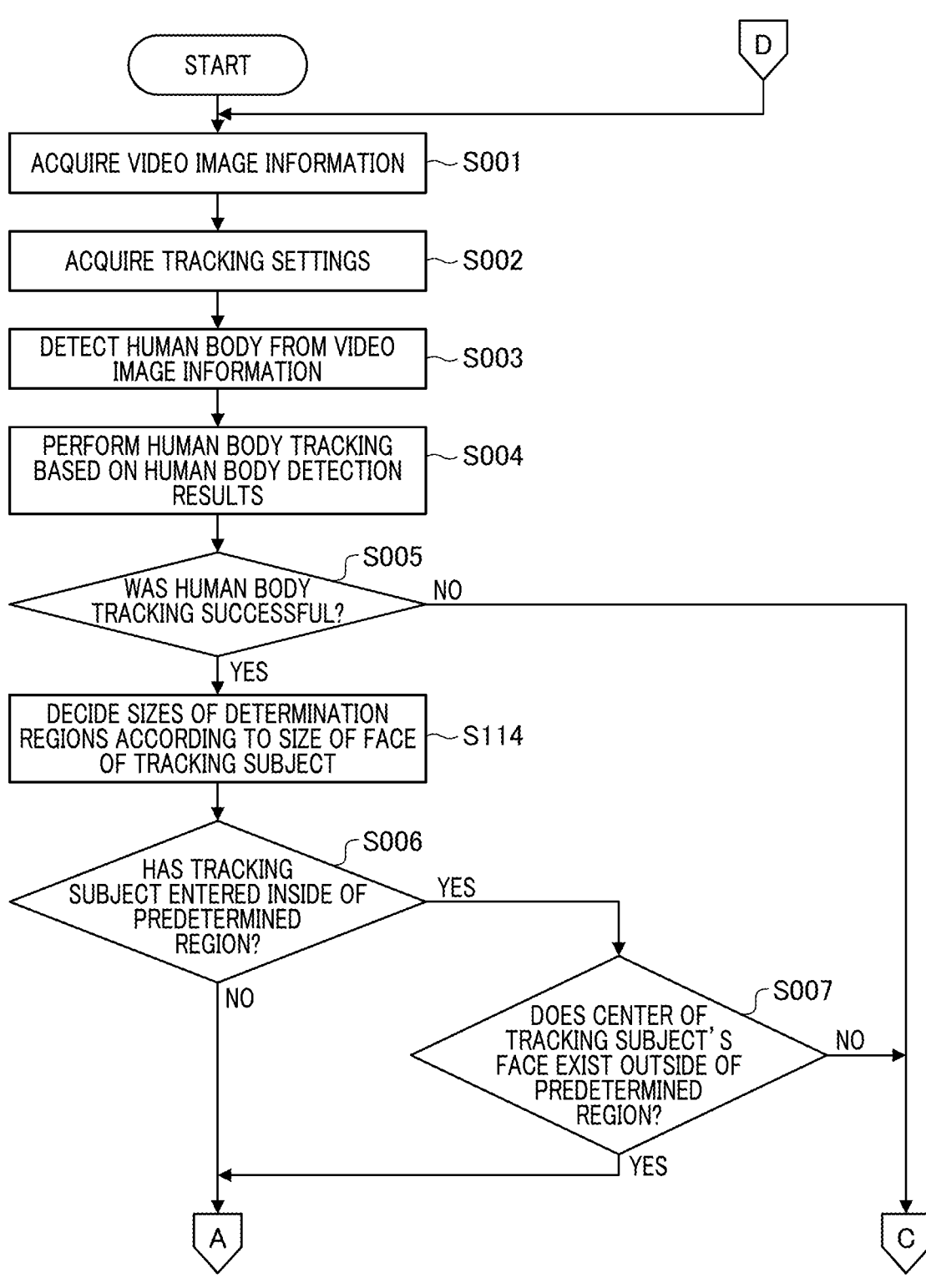
FIG. 20 is a flowchart showing processing procedures for the automatic image capturing system according to the Fourth Embodiment of the present invention.
Figure 21:
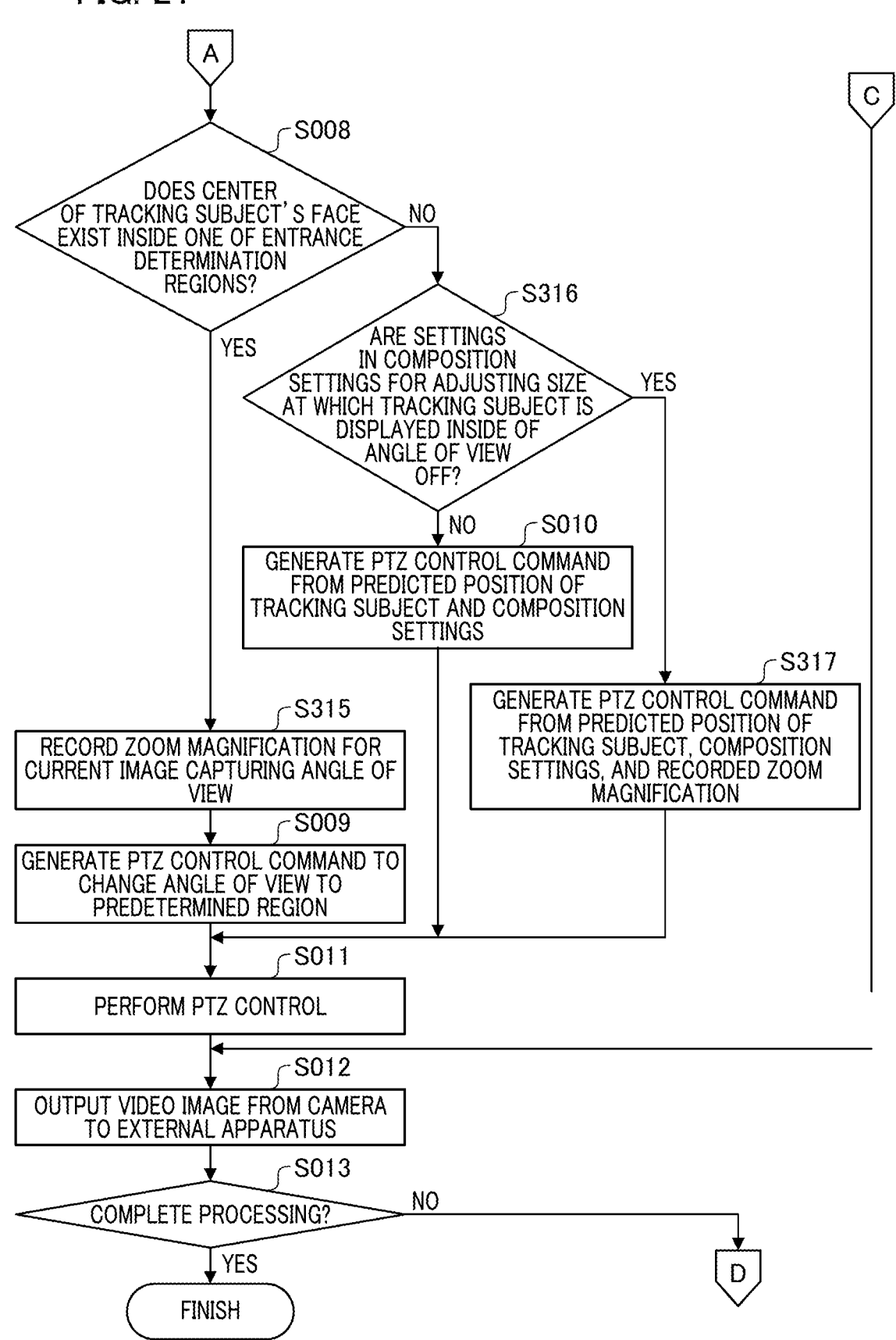
FIG. 21 is a flowchart showing processing procedures that are a continuation of FIG. 20.

FIG. 20 is a flowchart showing processing procedures for the image capturing apparatus according to the Fourth Embodiment of the present invention, and FIG. 21 is a flowchart showing processing procedures that are a continuation of FIG. 20. Note that the operations for each step of the flowcharts in FIG. 20 and FIG. 21 are performed by the CPU, or the like, that serves as computer inside of the image capturing apparatus executing a computer program that has been stored on a memory.

The flow in FIG. 20 and FIG. 21 is started when the image capturing apparatus D1020 of the automatic image capturing system D1000 is started up by a user operation. First, during step S001, the video image acquisition unit A1005 acquires video image information from the video image acquisition apparatus A1001, and outputs this to the facial detection unit A1006 and the video image output unit A1013. Next, the processing proceeds to step S002.

During step S002, the user input acquisition unit A1002 acquires the region information and composition settings (settings showing the position at which the tracking subject is displayed and the size at which the tracking subject is displayed on the screen) that have been set by the user, and the automatic selection settings for the tracking target, and outputs these to the tracking setting unit A1007. The tracking setting unit A1007 outputs the region information and composition settings that have been input, and the automatic selection settings for the tracking target, to the tracking settings recording unit A1008, and these are recorded. Next, the processing proceeds to step S003.

During step S003, the facial detection unit A1006 performs facial detection that serves as human body detection by performing image recognition based on the video image information that has been input. In addition, the facial information that has been detected and the video image information are output to the tracking processing unit A1009. Next, the processing proceeds to step S004.

During step S004, the tracking setting unit A1007 selects a tracking target from the facial information that has been input, and performs tracking processing. In addition, the coordinate information for the tracking subject, which serves as the tracking processing results, is output to the region inside/outside determining unit D1008. Next, the processing proceeds to step S005.

During step S005, the tracking setting unit A1007 determines whether or not the tracking processing for a human body (a face) has succeeded. In a case in which step S005 is Yes, the processing proceeds to step S114. In a case in which step S005 is No, the processing proceeds to step S012 of FIG. 21 via C of FIG. 20.

During step S114, the region inside/outside determining unit D1008 dynamically decides the sizes of the entrance determination region and the exit determination region of the set region according to the size of the face of the tracking subject. This processing is the same as the processing in the Second Embodiment. Note that, in the Fourth Embodiment, this step is not essential. Next, the processing proceeds to step S006.

During step S0006, the region inside/outside determining unit D1008 determines whether or not the tracking subject has entered inside of the predetermined region. This determination processing is processing for firstly confirming whether or not the tracking subject already exists inside of the predetermined region. Note that, in a case in which a plurality of predetermined regions has been set, it is confirmed whether or not the tracking subject exists inside one of the predetermined regions.

In a case of Yes for step S006, that is, in case in which the tracking subject exists inside of the predetermined region, the processing proceeds to step S007. In a case of No for step S006, that is, in a case in which the tracking subject does not exist within the predetermined region, the processing proceeds to step S008 of FIG. 21 via A of FIG. 20.

During step S007, the region inside/outside determining unit D1008 determines whether or not the center of the facial box (or face) of the tracking subject exists outside of the exit determination region. That is, during step S007, it is determined whether or not the tracking target, which existed inside of the predetermined region during step S006, has exited from the exit determination region inside of the predetermined region.

In a case of Yes for step S007, that is, in a case in which the tracking subject has exited from the exit determination region inside of the predetermined region, the processing proceeds to step S008 of FIG. 21 via B of FIG. 20. In the case of No for step S007, that is, in a case in which the tracking subject has not exited from the exit determination region inside of the predetermined region, and has continued to be stopped inside of the predetermined region, this information is output to the angle of view operating calculation unit D1011, and the processing proceeds to step S012 of FIG. 21 via C of FIG. 20.

During step S008 of FIG. 21, the region inside/outside determining unit D1008 determines whether or not the center of the facial box (or the face) for the tracking subject exists within the entrance determination region, and outputs the determination results to the angle of view operating calculation unit D1011.

That is, during step S008, it is determined whether or not the tracking subject, which did not exist inside of the predetermined region during step S006, has entered the entrance determination region inside of the predetermined region. In addition, during step S007, it is determined whether or not the tracking subject, which had exited from inside of the exit determination region, has once again entered inside of the entrance determination region for the predetermined region.

In the case of Yes for step S008, that is, a case in which the tracking subject has entered the entrance determination region inside of the predetermined region, the processing proceeds to step S315. In a case of No for step S008, that is, in a case in which the tracking subject has not entered the entrance determination region inside of the predetermined region, the processing proceeds to step S316.

During step S315, the region inside/outside determining unit D1008 outputs the current zoom magnification to the zoom magnification recording unit D1015 and records this. That is, the size of the image capturing range, before the size of the image capturing range was changed, is recorded. Next, the processing proceeds to step S009.

In contrast, during step S316, the angle of view operations calculating unit D1011 determines whether or not the adjustment settings for the size at which the tracking subject is displayed within the screen are off in the composition settings. In a case of No during step S316, the processing proceeds to step S1010. In a case of Yes during step S316, the processing proceeds to step S317.

During step S317, the angle of view operations calculating unit D1011 sets the angle of view (control value) based on an estimated position of the tracking subject, the settings for the position at which the tracking subject is displayed within the screen that have been acquired from the tracking setting unit A1007, and the zoom magnification that has been acquired from the zoom magnification recording unit D1015.

That is, when the target has exited to the outside of the predetermined region, control is performed such that the size of the image capturing range becomes the size of the image capturing range (the zoom magnification) that was recorded during step S315 when the target entered the predetermined region. In addition, the angle of view control value that has been calculated is output to the angle of view operating unit A1012, and a PTZ control command is generated. Next, the processing proceeds to step S011.

Figure 22:
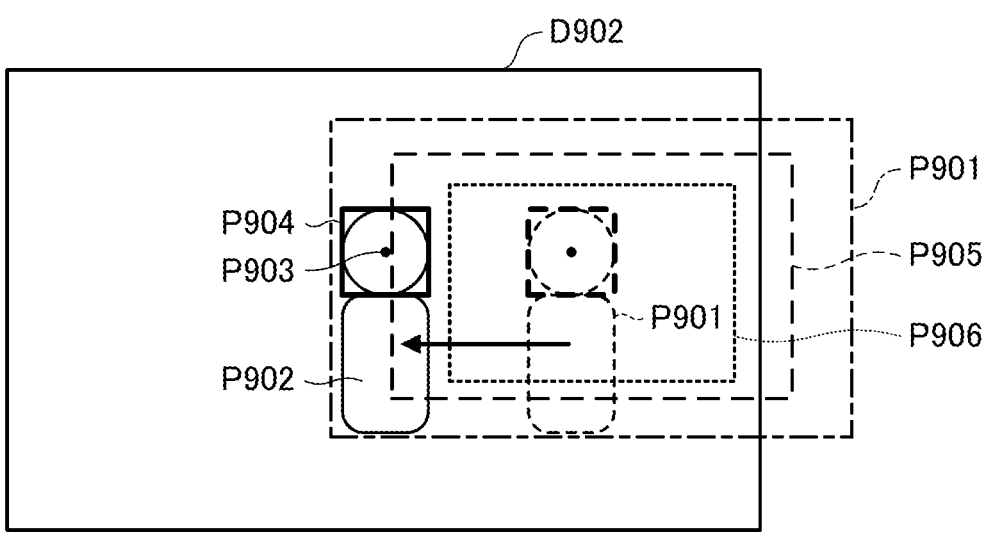
FIG. 22 is a diagram explaining that, when it has been determined that the tracking subject according to the Fourth Embodiment of the present invention has exited the region, the angle of view control is performed according to a zoom magnification that was recorded when the tracking subject entered the region, and the composition settings.

Note that FIG. 22 is a diagram explaining how the angle of view control is performed according to the zoom magnification that was recorded upon entrance to the predetermined region and the composition settings at a time when it has been determined that the tracking subject has exited from the predetermined region according to the Fourth Embodiment of the present invention. In the example that is shown in FIG. 22, in a case in which the position P901 of the tracking subject exists within the entrance determination region P906, the angle of view is controlled such that it becomes an angle of view corresponding to the predetermined region (the region that has been set).

However, in a case in which the tracking subject moves to the position P902, and the center P903 of their facial box P904 goes outside of the exit determination region 905, control is performed such that the angle of view becomes D902 based on the zoom magnification that was recorded in the zoom magnification recording unit D1015 at the time of entrance into the predetermined region, and the composition settings.

In contrast, during step S009, the angle of view operating calculations unit D1011 calculates an angle of view control value for changing the angle of view to the predetermined region that the tracking target has entered, and outputs this to the angle of view operating unit A1012, then generates a PTZ control command. Next, the processing proceeds to step S011.

In addition, during step S010, the angle of view operating calculation unit D1011 calculates an angle of view control value for showing the tracking target within the screen according to the composition settings that have been acquired from the tracking setting unit A1007, and outputs this to the angle of view operating unit A1012, then generates a PTZ control command, Next, the processing proceeds to step S011.

During step S011, the angle of view operating unit A1012 outputs the PTZ control command to the PTZ drive apparatus A1003 based on the angle of view control value that has been input from the angle of view operating unit D1011. In addition, the PTZ drive apparatus A1003 changes the image capturing angle of view by performing PTZ drive. Next, the processing proceeds to step S012. During step S012, the video image output unit A1013 outputs the video image information that has been input to the external apparatus A1014. Next, the processing proceeds to step S013.

During step S013, it is discerned whether or not a stop operation that turns the image capturing apparatus off has been performed by a user operation. In the case of No during step S013, the processing returns to step S001 of FIG. 20 via D of FIG. 21, and in a case of Yes during step S013, the automatic image capturing processing is completed, and the flow in FIG. 20 and FIG. 21 is completed.

In this context, the zoom magnification that has been recorded (stored) during step S315 is read out during the next step S317, and is used in the control of the image capturing range (zoom magnification) during step S011.

That is, when the tracking subject enters into the predetermined region, along with changing the image capturing range for the image capturing unit, the size of the image capturing range from before the angle of view was changed is stored, and when the target exits to the outside of the predetermined region, the image capturing range is controlled so as to become the size of the image capturing range that was stored.

As has been described above, in the Fourth Embodiment, in a case in which the settings for the size at which the tracking subject will be displayed within the screen, which serve as composition settings, are turned off, the zoom magnification from the time at which the tracking subject entered the predetermined region is recorded.

In addition, when it has been determined that the tracking subject has exited from inside of the predetermined region, the angle of view control is performed according to the zoom magnification that was recorded and the settings for the position at which the tracking subject is displayed within the screen, which serve as composition settings. It is thereby possible to perform angle of view control such that there are almost no changes to the zoom magnification before the tracking subject enters the predetermined region and after they exit the predetermined region.

That is, in the Fourth Embodiment, when the tracking subject enters inside of the predetermined region, along with changing the image capturing range of the image capturing unit, the size (zoom ratio) of the image capturing range from before the change (before entrance) is recorded.

In addition, in a case in which it has been determined that the target has exited from inside of the above-described predetermined region, the zoom magnification for the image capturing unit is set to be the same zoom magnification as the size (zoom magnification) for the image capturing range that has been stored. Therefore, it is possible to perform tracking with an image capturing range size that does not seem unnatural even in cases in which the target enters and exits the predetermined region frequently Note that step S006 to step S008, and step S316, and the like, function as a determining step for determining whether or not the target has exited from inside of the predetermined region. In addition, during this determining step, an exit determination is performed based on whether or not the target has exited from a determination region that is smaller than the predetermined region.

In addition, step S317 functions as a zoom magnification setting step for setting the zoom magnification of the image capturing unit to the same zoom magnification as the zoom magnification from before the target entered the predetermined region, in a case in which it has been determined that the target has exited from inside of the predetermined region. Note that, in the above description, the term "the same zoom ratio" is not limited to exactly the same zoom ratio, and also includes zoom ratios that are approximately the same.

Note that, in the Fourth Embodiment, entrances are determined using the entrance determination region when the target enters into the predetermined region, and exits are determined using the exit determination region, which is larger than the entrance determination region, when the target exits to outside of the predetermined region. However, the Fourth Embodiment may also be applied to cases in which the entrance determination region and the exit determination region are the same size, and the sizes of the entrance determination region and the exit determination region are not limited.

Note that, in the Fourth Embodiment, when it has been determined that the tracking subject has exited from the predetermined region, and angle of view control is being performed according to the composition settings and the zoom magnification, it may also be made such that PT control is performed according to the composition settings while returning the zoom magnification to the zoom magnification that has been recorded.

In addition, in the configurations for the First Embodiment to the Fourth Embodiment, the configurations may also be made such that, when the tracking target is lost from view in a state in which the tracking target has entered inside of the predetermined region, the angle of view is moved to an angle of view that was indicated in advance, and a search is performed for the tracking subject.

In addition, in the configurations of the First Embodiment to the Fourth Embodiment, the configuration may also be made such that, when it appears that the tracking target will fall below the smallest detection size in a state in which the tracking subject has entered into the predetermined region, the fixed angle of view is released, and zooming in is performed such that the tracking subject is not lost from view.

Fifth Embodiment

Next, the hardware configuration of the image capturing apparatus will be explained with reference to FIG. 23. A configuration example of the hardware for the image capturing apparatus will be explained using the block diagram from FIG. 23.

Figure 23:
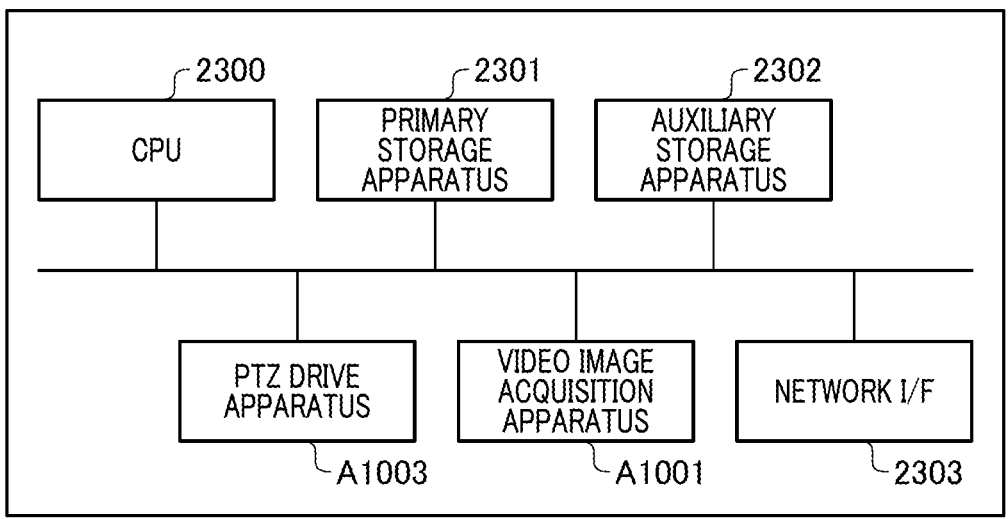
FIG. 23 is a diagram showing a hardware configuration of an image capturing apparatus.

As is shown in FIG. 23, the image capturing apparatus can be configured so as to include a CPU 2300, a primary storage apparatus 2301, an auxiliary storage apparatus 2302, a PTZ drive apparatus A1003, and a video image acquisition apparatus A1001. Note that the configuration shown in FIG. 23 is simply one example of a configuration that can be applied to the image capturing apparatus, and appropriate variations and modifications are possible.

The CPU 2300, which serves as the information processing apparatus A1004 executes processing by using a computer program and data that are stored on the primary storage apparatus 212. The CPU 211 thereby performs operation controls for the entirety of the image capturing apparatus, along with executing or controlling each of the above-described processing that are executed by the image capturing apparatus.

For example, the CPU 2300 realizes the functions of each functional unit of the information processing apparatus A1004 that were shown in FIG. 1, FIG. 10, FIG. 15, and FIG. 19 by executing processing using a computer program and data that are stored on the primary storage apparatus 2301.

The primary storage apparatus 212 is a storage apparatus such as a RAM (random access memory), or the like. The primary storage apparatus 2301 stores a computer program and data that have been loaded from the auxiliary storage apparatus 2302. In addition, this also has an area for saving the captured images that have been acquired from the video image acquisition apparatus A1001, and each type of data that has been received from the external apparatus A1014 via a network I/F 2303.

The primary storage apparatus 2301 further has a work area that is used when the CPU 2300 is executing each type of processing. In this manner, the primary storage apparatus 2301 is able to appropriately provide each type of area.

The auxiliary storage apparatus 2302 is a large capacity information storage apparatus such as a hard disk drive (HDD), a ROM (a read only memory), or an SSD (solid state drive), or the like.

An OS (operating system), as well as a computer program and data for the CPU 2300 to execute or to control each processing that was explained above as being performed by the image capturing apparatus are stored on the auxiliary storage apparatus 2302. In addition, the data that has been received from the external apparatus A1014 via the network I/F 2303 (for example, the above-described image capturing parameters) are also stored on the auxiliary storage apparatus 2302.

The computer program and data that are stored on the auxiliary storage apparatus 2302 are appropriately loaded by the primary storage apparatus according to controls from the CPU 2300, and these become targets for processing by the CPU 2300.

As was described above, the PTZ drive apparatus A1003 has a function for changing the angle of view of the image capturing apparatus and is configured by a drive apparatus such as a motor, or the like, for performing at least one of pan, tilt, or zoom control.

As has been explained above, the video image acquisition apparatus A1001 is a unit that generates captured video images by performing image capturing of its surroundings, and is configured by a camera or the like. The network I/F 2303 is an interface that the image capturing apparatus uses in order to perform data communications with the external apparatus A1014 via a network.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part of or the whole of the control according to the embodiments, a computer program realizing the function of the embodiments described above may be supplied to the information processing apparatus through a network or various storage media. Then, a computer (or a CPU, an MPU, or the like) of the image capturing apparatus may be configured to read and to execute the program. In such a case, the program and the storage medium storing the program configure the present invention.

In addition, the present invention also includes, for example, inventions that are realized by using at least one processor or circuit configured to function as the embodiment explained above. Note that it may also be made such that a plurality of processors is used, and are made to perform distributed processing.

What is claimed is:
1. An information processing apparatus comprising:
at least one memory; and at least one processor configured to communication with the memory, wherein the at least one processor is configured to perform:

detecting a predetermined target from an image captured by an image capturing device;

setting a predetermined region and an exit determination region that is smaller than the predetermined region;

setting a display position and a display size of the predetermined target within the image; and controlling, in a case in which the predetermined target exists outside the exit determination region, an image capturing range of the image capturing device so that the image including the predetermined target becomes at the set display position and the set display size.

2. The information processing apparatus according to claim 1, wherein a size of the exit determination region is changed according to a size of the image capturing range.

3. The information processing apparatus according to claim 1, wherein a size of the entrance determination region is changed according to a size of the image capturing range.

4. The information processing apparatus according to claim 1, wherein the at least one processor is further configured to perform determining if the predetermined target exists outside the exit determination region.

5. The information processing apparatus according to claim 4, wherein, in a case in which a center of a face of the predetermined target exists outside the exit determination region, the determining is performed such that the predetermined target exists outside the exit determination region.

6. The information processing apparatus according to claim 4, wherein the at least one processor is further configured to perform:

setting an entrance determination region that is smaller than the exit determination region; and determining if the predetermined target exists inside the entrance determination region.

7. The information processing apparatus according to claim 6, wherein, in a case in which the predetermined target exists inside the entrance determination region, the image capturing range of the image capturing device is controlled to image the predetermined region without the tracking for the predetermined target.

8. The information processing apparatus according to claim 6, wherein, in a case in which a center of a face of the predetermined target exists inside the entrance determination region, the determining is performed such that the predetermined target exists inside the entrance determination region.

9. An information processing method comprising:

detecting a predetermined target from an image captured by an image capturing device;

setting a predetermined region and an exit determination region that is smaller than the predetermined region setting a display position and a display size of the predetermined target within the image; and controlling, in a case in which the predetermined target exists outside the exit determination region, an image capturing range of the image capturing device so that the image including the predetermined target becomes at the set display position and the set display size.

10. An information processing method comprising:

detecting a predetermined target from an image captured by an image capturing device;

setting a predetermined region, an exit determination region that is smaller than the predetermined region, and an entrance determination region that is smaller than the exit determination region;

controlling, in a case in which the predetermined target exists outside the exit determination region, an image capturing range of the image capturing device to perform a tracking for the predetermined target based on a position of the predetermined target; and controlling, in a case in which the predetermined target exists inside the entrance determination region, the image capturing range of the image capturing device to image the predetermined region without the tracking for the predetermined target.

11. An information processing apparatus comprising:

at least one memory; and at least one processor configured to communicate with the memory, wherein the at least one processor is configured to perform:

detecting a predetermined target from an image captured by an image capturing device;

setting a predetermined region, an exit determination region that is smaller than the predetermined region, and an entrance determination region that is smaller than the exit determination region;

controlling, in a case in which the predetermined target exists outside the exit determination region, an image capturing range of the image capturing device to perform tracking of the predetermined target based on a position of the predetermined target; and controlling, in a case in which the predetermined target exists inside the entrance determination region, the image capturing range of the image capturing device to image the predetermined region without the tracking for the predetermined target.

12. The information processing apparatus according to claim 11, wherein a size of the exit determination region is changed according to a size of the image capturing range.

13. The information processing apparatus according to claim 11, wherein a size of the entrance determination region is changed according to a size of the image capturing range.

14. The information processing apparatus according to claim 11, wherein, in a case in which the predetermined target exists inside the exit determination region and outside the entrance determination region, and, in a case in which the tracking is performed, the tracking is continued, and, in a case in which the tracking is not performed, an image capturing of the predetermined region is maintained without performing the tracking for the predetermined target.

15. The information processing apparatus according to claim 14, wherein the at least one processor is further configured to perform:

setting a display position and a display size of the predetermined target within the image; and controlling, in a case in which the predetermined target exists outside the exit determination region, an image capturing range of the image capturing device so that the image including the predetermined target at the set display position and the set display size.

16. The information processing apparatus according to claim 11, wherein the at least one processor is further configured to perform determining if the predetermined target exists outside the exit determination region, and, if the predetermined target exists inside the entrance determination region.

17. The information processing apparatus according to claim 16, wherein, in a case in which a center of a face of the predetermined target exists inside the entrance determination region, the determining is performed such that the predetermined target exists inside the entrance determination region.

18. The information processing apparatus according to claim 16, wherein, in a case in which a center of a face of the predetermined target exists outside the exit determination region, the determining is performed such that the predetermined target exists outside the exit determination region.

* * * * *